US012769798B1

(12) United States Patent
Horakeri et al.

(10) Patent No.: US 12,769,798 B1
(45) Date of Patent: Oct. 20, 2026

(54) SYSTEMS AND METHODS OF CONTROLLING DIGITAL COMMUNICATIONS ESTABLISHING PERSONALIZED CAROUSEL IDENTIFIERS

(71) Applicant: Walmart Apollo, LLC, Bentonville, AR (US)

(72) Inventors: Sujit Shambuling Horakeri, Hubli (IN); Chittaranjan Tripathy, Sunnyvale, CA (US); Harshal Tripathi, Sunnyvale, CA (US); Tushar Agrawal, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 19/182,336

(22) Filed: Apr. 17, 2025

(51) Int. Cl.
*G06F 16/953* (2019.01)

(52) U.S. Cl.
CPC .................................. *G06F 16/953* (2019.01)

(58) Field of Classification Search
CPC .................................................... G06F 16/953
See application file for complete search history.

(56) References Cited

U.S. PATENT DOCUMENTS

| | | | | |
|---|---|---|---|---|
| 10,275,485 | B2* | 4/2019 | Joshi | G06F 16/245 |
| 11,847,671 | B2 | 12/2023 | Estes | |
| 2021/0241344 | A1* | 8/2021 | Mantha | G06F 16/9035 |
| 2023/0289868 | A1* | 9/2023 | Bender | G06N 5/022 |
| 2024/0020321 | A1* | 1/2024 | Mosenia | G06F 16/9536 |
| 2024/0202796 | A1* | 6/2024 | Sadr | G06Q 30/0621 |
| 2024/0257214 | A1 | 8/2024 | Vashishtha | |
| 2024/0394771 | A1 | 11/2024 | Archak | |
| 2025/0245731 | A1* | 7/2025 | Yaqoob | G06Q 30/0625 |
| 2025/0328594 | A1* | 10/2025 | Gudla | G06F 16/9538 |

OTHER PUBLICATIONS

Evidently AI; "LLM-as-a-judge: a complete guide to using LLMs for evaluations"; <https://www.evidentlyai.com/llm-guide/llm-as-a-judge>; Jan. 9, 2025; pp. 1-34.

Vashishtha, Shanu, et al. "Leveraging User-Generated Reviews for Recommender Systems with Dynamic Headers"; Personalization and Recommendation; Sep. 11, 2024; Walmart Global Tech; alarXiv:2409.07627v1; 7 pages.

* cited by examiner

*Primary Examiner* — Kris E Mackes
(74) *Attorney, Agent, or Firm* — Fitch, Even, Tabin & Flannery LLP

(57) ABSTRACT

Some embodiments relate to controlling digital communications. An example implementation may cause an execution of a trained first model applied to historic features of groupings of items and obtaining a set of carousel identifiers; obtain session context corresponding to a first set of items during a current network session; perform a similarity search in the collection of the sets of carousel identifiers, and identify a first set of carousel identifiers having a threshold relationship with the session context; determine a ranking of the first set of carousel identifiers and identify a first carousel identifier having an estimated highest ranked association with the network session; and control the data communications transceiver to transmit carousel content data in controlling the user computing device to render the carousel content data comprising the first carousel identifier consistent with the carousel interface.

20 Claims, 11 Drawing Sheets

SYSTEMS AND METHODS OF CONTROLLING DIGITAL COMMUNICATIONS ESTABLISHING PERSONALIZED CAROUSEL IDENTIFIERS

TECHNICAL FIELD

This disclosure relates generally to controlling digital communications in controlling user computing devices.

BACKGROUND

There are many systems that respond to queries. Some of these systems are Internet systems receiving queries over the Internet. These systems can provide information relevant to the queries. There is a need, however, to improve the communications and content in response to these queries.

BRIEF DESCRIPTION OF DRAWINGS

Disclosed herein are embodiments of systems, apparatuses and methods pertaining to controlling digital communications in controlling user computing devices. This description includes drawings, wherein.

Figure 1:
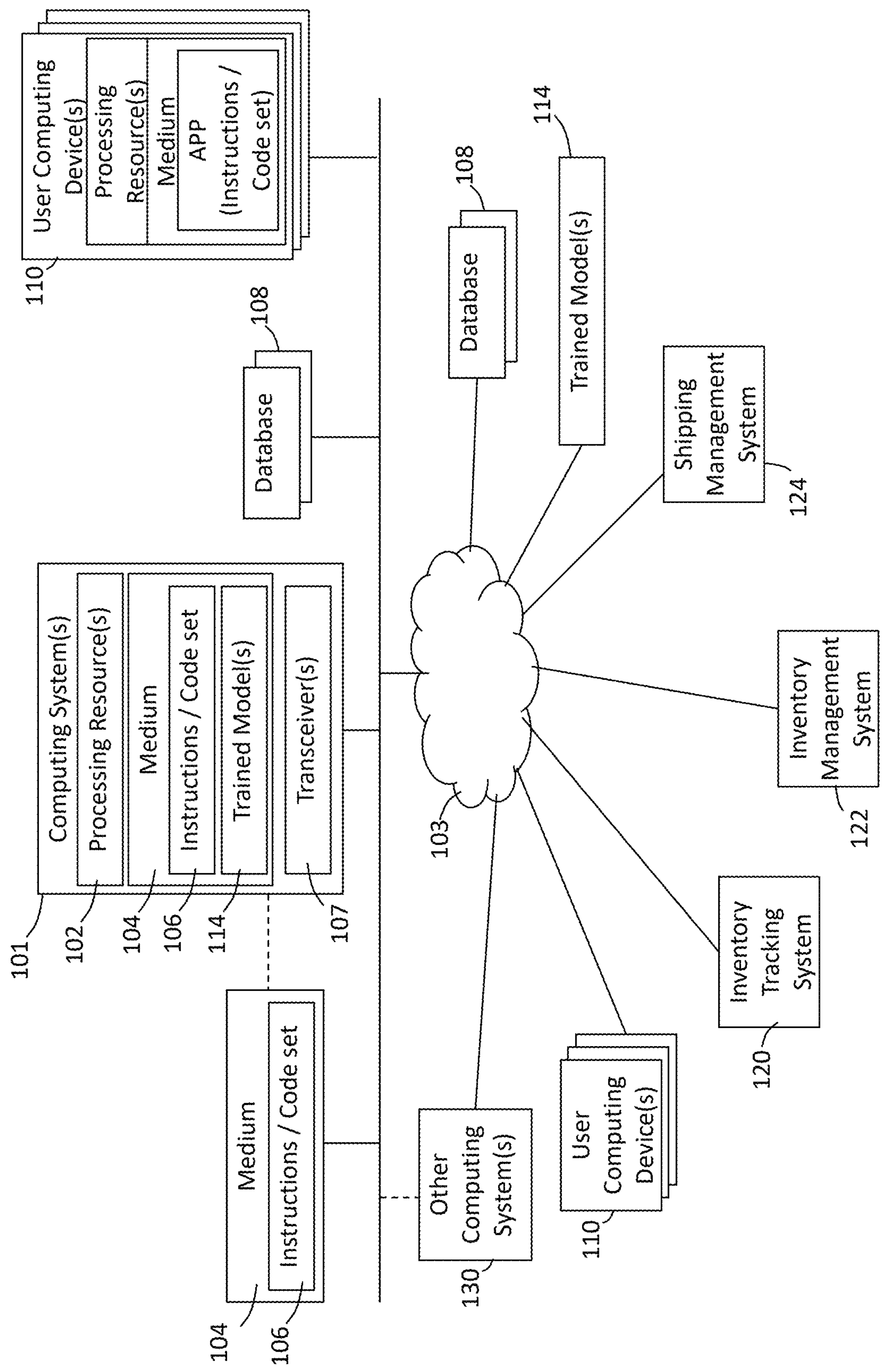
FIG. 1 illustrates a block diagram of an example communications control system that controls digital communications between electronic system components over one or more distributed networks, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of example embodiments. Reference throughout this specification to "one embodiment," "an embodiment," "some embodiments," "an implementation," "some implementations," "some applications," or similar language means that a particular feature, structure, or characteristic described in connection with the embodiment is included in but is not limited to at least one embodiment of the invention. Thus, appearances of the phrases "in one embodiment," "in an embodiment," "in some embodiments," "in some implementations," and similar language throughout this specification may, but do not necessarily, all refer to the same embodiment.

Present embodiments address well known network and Internet problems of providing relevant content without adversely delaying a response and latency problems in responding to inquiries. Some present embodiments in part utilize processing resources to asynchronously process relevant information off-line and independent of a current network session to improve response time while further improving response results based in part on more relevant content to a particular individual user while further providing more relevant customized identifiers, which in some embodiments is referred to carousel titles of the relevant content. The processing resources, in part utilizing asynchronous non-real-time execution, overcome some well known network-centric and Internet-centric problems in distributing content that is more relevant to a particular user, and that can provide the particular user with more contextual understanding of the content being provided. This contextual understanding can help the particular user identify information and/or items of interest as a function of a current session, content accessed during a current session and items considered and/or selected during the current session, and/or other relevant current session content. As such, some embodiments take advantage of off-line processing to greatly reduce real-time processing, while still providing more relevant contextual information in real-time using current network session content. The processing resources further address these well known network and Internet-centric problems in part by preemptively generating and storing contextually relevant identifiers and/or carousel identifiers of groupings of items, which in some implementations can be generated through one or more trained machine learning models. Current, real-time network session content can be evaluated in real-time to identify a stored carousel identifier that has a threshold relationship with the current network session content. The systems control communications and the information presented to the user in response to the network session content in managing content. Historically, previous carousel identifiers are static, predefined identifiers that provide very little information to a user and have very little relevance to the content and/or items that a user has been evaluating and/or considering during a current session. For example, many historic carousel identifiers include "Recommended for You," "Recommended with your cart" or "Customers Also Bought," with the identifier providing little to no contextual information or relevance, which often lead to carousel blindness, users tending to ignore carousels and other such ineffective results. The lack of attention drawn to carousels significantly diminishes the effectiveness of carousels and/or the inclusion of additional items that may be of interest to a particular user. For example, with retail the lack of attention to carousels has resulted in fewer interactions with potentially relevant items, causing missed opportunities for cross-sells, upsells, and an overall decrease in engagement.

Figure 2:
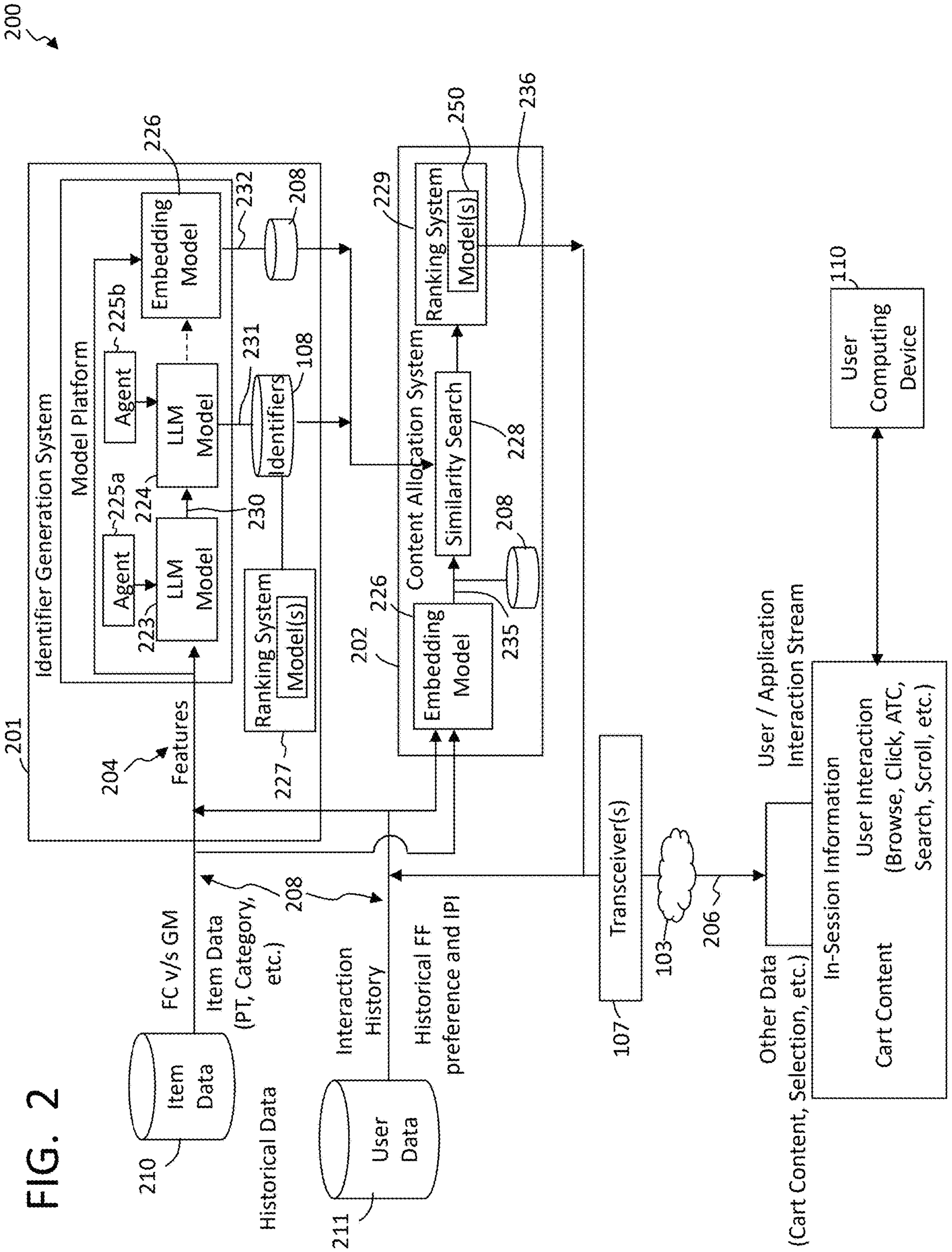
FIG. 2 illustrates a block diagram of an example carousel generation system, in accordance with some embodiments.

FIG. 1 illustrates a block diagram of an example communications control system 100 that controls digital communications between electronic system components over one or more distributed networks 103, in accordance with some embodiments. The electronic system components comprise one or more content and/or item acquisition systems 101 that enable remote access to item information and allow remote users to select and acquire items. FIG. 2 illustrates a block diagram of an example carousel generation system 200, in accordance with some embodiments, which can be implemented as part of the item acquisition system 101 and/or separate from the item acquisition system. In some embodiments, an example item acquisition system is an ecommerce system that allows remote users, such as customers, remote access to product information and allows the remote users to select and purchase products. Further, the carousel generation system 200 can be implemented through one or more electronic processing resources 102 each executing instructions 106 and utilizing machine learning models 114. In some embodiments, the processing resources are control circuits 110 and may include any suitable processing resource and/or processor configured to execute instructions stored in a computer-readable storage memory (e.g., a non-transitory, computer-readable storage medium). In this context, the terms processing resource, control circuit and controller can refer broadly to any microcontroller, computer, or processor-based device with processor, memory, and programmable input/output peripherals, which is generally designed to govern the operation of other components and devices. In some implementations, the system 100 can include one or more electronic processing resources 102 that may include one or more microcontrollers, one or more microprocessors, one or more central processing unit cores, one or more application-specific integrated circuits (ASIC), one or more servers, one or more field programmable gate arrays (FPGA), control logic, other such systems or a combination of two or more of such systems. The communications control system 100 further includes a machine readable medium 104 that may be non-transitory and include for example one or more random access memory (RAM), one or more read-only memory (ROM), one or more electrically erasable programmable read-only memory (EEPROM), one or more flash memory, one or more hard disk drives, other such mediums, or a combination of two or more of such mediums. Some or all of the medium 104 include one or more databases accessible via the network 103 that maintains and stores relevant data. Further, the medium 104 may be part of the processing resource, external to and accessible to the processing resource 102, or a combination of internal and external mediums. Additionally, one or more mediums may be remote and provide distributed and/or redundant storage. The one or more distributed networks 103 can be substantially any relevant wired and/or wireless computer and/or communications networks (one or more local area networks (LAN), one or more wireless area networks (WAN), one or more other wireless networks (e.g., cellular, Wi-Fi, Bluetooth, LoRa, LoRa-WAN, etc.), other such networks, or a combination of two or more of such networks). The processing resources 12 and/or processor-based control circuit or controller may be configured (for example, by using corresponding programming stored in a memory as will be well understood by those skilled in the art) to carry out one or more of the steps, actions, and/or functions described herein.

The processing resource 102 may execute instructions 106 (e.g., programming, software code, etc.) stored on machine readable medium 104 that when executed by processing resource 102 causes the processing resource to perform functions of the communications control system 100 and/or the carousel generation system 200, providing access to item information, initiating order fulfillment, tracking order fulfillment, updating item information, training models, retraining models over time, generating contextually relevant identifiers and/or identifiers, identifying relevant identifiers and/or identifiers, control communications in part to distribute contextually relevant identifiers and/or identifiers based on and/or in cooperation with related item information, other such functions, and typically a combination of two or more of such functions.

Additionally or alternatively, the processing resource 102 may include electronic circuitry for performing some or all of the functionality described herein. The communications control system 100 may also include other hardware components, such as physical storage (e.g., hard disk drive, a solid state drive, or the like, or a plurality of such storage devices (e.g., an array of disks)), and may be locally attached (i.e., installed) in the communications control system 100. In some implementations, physical storage may be accessed as a block storage device. The processing resource is communicatively coupled with and/or controls one or more wired and/or wireless data communications transceivers 107, transmitters and/or receivers that each communicatively coupled with and enable communication over one or more of the distributed communications networks 103. The processing resource 102 is communicatively coupled with the one or more transceivers 107 and control communicates from and/or to the processing resource and/or at least some communications from and/or to the communications control system 100 to manage at least the response to queries, data distribution, retrieve information, and/or other such communications.

The communications control system 100 includes and/or is in communication with one or more internal and/or external database 108 that can store data, instructions, models and/or other such electronic content for use by the processing resource 102, other local systems and/or remote systems. Further, the databases 108 may be part of the processing resource 102, the medium 104 and/or one or more separate mediums. The communications control system 100 typically further includes and/or is accessible by numerous user computing devices 110 (e.g., computer, laptop, tablet, smartphone, user wearable system, etc.) that are used by users to acquire information and/or interact with the item acquisition system 101 in response to different types of queries, such as queries for item information (e.g., products, components, parts, systems, etc.), information about a person or group of people, information about an entity, pricing information, sales transaction information, financial transaction information, entertainment information, sports information, news information, and/or substantially any other relevant information.

In some embodiments, the communications control system 100 can include, be a part of and/or can be communicatively coupled with one or more entities, such as but not limited to one or more retail entities, Internet data source entities, manufacturing entities, energy distribution entities, investment entities, financial institution entities and/or other such entities. For example, the communications control system 100 may be part of a retail entity that manages retail inventory, the access to item information, enabling virtual cart generation and management, the distribution of inventory and/or the sale of inventory, other such content, and typically a combination of two or more of such content. As such, the communications control system 100 can include and/or be communicatively coupled with one or more inventory tracking systems 120 that can track inventory within one or more facilities, expected to be received at the facility and/or distributed and/or sold from the facility, one or more inventory management systems 122 that can track inventory between two or more facilities, one or more shipping management systems 124 that can manage the distribution of items (e.g., products) from a facility and/or to a facility (e.g., manage shipping to customers), other such systems, and typically a combination of two or more of such systems. The processing resource 102 and/or communications control system 100 may be in communication with one or more other computing systems 130, via one or more wired and/or wireless communications networks 103 for example. The other computing systems may be similar to the communications control system 100 or other computing systems, and may each include at least one processing resource that can include and/or be communicatively coupled with one or more machine readable mediums. The computing systems may each execute software (e.g., processing resource executing certain instructions).

The communications control system 100, in part manages and/or controls digital communications between electronic system components over one or more of the distributed networks 103. The processing resource 102 is configured to utilize information about relationships between items and information about user access to content and requests to acquire information that is to be utilized by respective applications at user computing devices 110 and/or other system computing devices. For example, mobile applications (APPs) being executed on users' smartphones, tablets, computers and/or other such user computing devices 110 can include multiple applications that initiate queries for data that can control one or more graphical user interfaces (GUIs) rendering some or all of that information to a user. As a non-limiting example, an item search application of a shopping APP can communicate a query/request for information about one or more products that are offered for sale by a retail entity. In response to that query, the processing resource can respond with data relevant to that query, and that data can include information that can dictate and/or at least partially control how some or all of that data and/or content is presented and rendered through the user computing device 110 to the user. In some embodiments, products can be considered one type of item, and a product may be more generically referred to as an item. In some embodiments, the item acquisition systems 101 can provide relevant information about recommended items to a user, which in some instances can correspond to items considered by the user, intended to be acquired by the user, current session search information, historic search information, historic purchases, other such information, or a combination of two or more of such information. Based on the recommended items, the item acquisition systems 101 can provide a more contextually relevant identifier and/or identifier that is relevant to at least the recommended items, and that is predicted to more likely draw the user's attention to the recommended items than historic carousel identifiers of other systems.

A current session can be a duration where a user, using a user computing device 110, implements communications over time with a data source through a series of one or more queries from one or more applications being executed on the user computing device. Such a current session can be relatively short, such as less than a minute or even less than 10 seconds when a single query is submitted, can be relatively long with a user implementing communications through multiple sequential queries that can last tens of minutes to multiple hours or more, and can be substantially any duration in between. For example, it is common with a retail shopping APP that a user maintains a current session for tens of minutes to even hours depending on many factors, including particularly a response time to queries as well as other factors (e.g., number of products a user is shopping for, number and/or types of products available from a data source, types and amounts of information available relative to different products from the retail data source, the presentation of the information to the user, the usability of a GUI and an APP, other such factors and typically a combination of two or more of such factors). As described above, it is a well known network-centric and Internet-centric problem that response time to queries is one of the most significant factors in an effectiveness of a data source in maintaining active current sessions and repeated use by users.

The processing resource 102, in some embodiments, in executing the instructions provides carousel content data in a predefined format consistent with a carousel interface that controls a remote user computing device 110 to render, within a session layout, the carousel content data comprising a customized carousel identifier personalized for the current network session and item information of a set of additional items consistent with the carousel interface. The carousel content is rendered within the session layout according to the predefined carousel information to provide the user with additional information. Further, the carousel identifier, customized relative to the network session and the user, is predicted to have more relevance to the user and increase a likelihood of further interaction of the user with the carousel interface.

In some embodiments, the carousel generation system 200 can include a non-real-time identifier generation system 201 and a real-time session content allocation system 202.

The related and/or recommended content determined by system 200 can be used, in some embodiments, as at least one of the factors in filtering, prioritizing, conditioning, organizing and/or otherwise adjusting content that controls a user computing device 110 in presenting content, including one or more carousel interfaces in response to in session context 206 or information, which can include but is not limited to item information, user history data, session actions, other users' history data, other such information, or a combination of such session information. Examples of session actions can include, but are not limited to a search for relevant content (e.g., a product search, key word search, image search, etc.), selection of an item to acquire additional information about the item, the addition of an item to a virtual cart, removal of an item from a cart, disregarded content, dwell time, other such in session actions, or a combination of two or more such actions. In some embodiments, the item acquisition system 101 can enhance response time by preforming some aspects of the customization independent of and prior to a current user network session, and subsequently utilizing results of the non-real-time evaluations during the network session in real-time to identify customized content that has a predicted higher relevance to the specific user during the current network session while significantly reducing delays and enhancing resulting content presented to the user.

The identifier generation system 201, in some embodiments, can operate to generate custom identifiers independent of a session by a user, and as such can take additional time to process relevant information to generate identifiers that are predicted to have more relevance to a group of items, and that is more relevant to users that may be recommended one or more of the items of a group or groups. This operation, off-line of a session, enables the processing to occur without adverse effects to users attempting to access and/or acquire information through a network session. In typical network sessions, there is a very limited amount of time in which a content source can assemble, format and communicate information to a user's computing device 110. The application of complex searching, trained machine learning models and/or other such data processing may introduce unreasonable delays. Accordingly, some embodiments operate the identifier generation system off-line and independent of any one network session. The session content allocation system 202, however, operates in real-time to provide rapid responses to in session activities, while utilizing previously generated carousel identifiers without the added delays that would otherwise be introduced if the carousel identifier was attempted to be generated in real-time.

In some embodiments, the processing resource 102, executing the instructions 106 in non-real-time, independent of and prior to a current network session between a user and the item acquisition system 101, to cause the execution of one or more trained first models 223 (e.g., a first large language model (LLM)) applied to historic features 204 of numerous historic groupings of items stored in a database 210. These historic groupings of items can comprise groupings of items that were identified as having threshold relevance to historic in-session item information. As some non-limiting examples, one or more groupings of recommended items can be identified based on items a user added to a virtual cart, one or more grouping of recommended items may be identified based on items that a user selected to access further information for consideration, and groupings of recommended items may be identified based on users' previous purchases. Historic features can be accessed about these historic groupings. Such features can include but are not limited to identifiers of the items of the groupings of items, one or more categories with which one or more of the items of a grouping of items are associated, item information (e.g., size, color, intended use, etc.), item counts, user data 211 (e.g., user preferences, user historic purchases, etc.), other such features, or a combination of two or more of such features.

Based on the application of the first LLM model(s) 223 relative to each of the different numerous historic groupings of items, the processing resource can obtain a set of one or more generated carousel identifiers that are generated to have particular relevance to the respective historic features of the respective historic grouping of items. The first LLM can utilize the features in structuring contextual identifiers of particular relevance to the group and/or one or more items of the group. The relevance often comprises at least a descriptive relevance to one or more of the items of a grouping, the use of one or more of the items and/or other such descriptive relevance. Other relevance may include but is not limited to a relevance to types of users, a relevance to a geographic location, a relevance to a season of the year, a relevance to a holiday, other such relevance, or a combination of two or more of such relevance. The processing resource, in causing the execution the first LLM model to be applied to the historic groupings of items and/or historic features, can obtain sets of one or more carousel identifiers 230, with the identifiers of each set of one or more carousel identifiers having particular relevance to a historic grouping of one or more items. This generation, in non-real-time, of the collection of sets of carousel identifiers does not introduce delays during in-session activity, can utilize extensive computation resources without adversely affecting response times to sessions, can be repeated over time to continue to develop more relevant sets of carousel identifiers based on continued training and retraining of and learning by the first LLM model 223, and exhibit other such benefits.

As such, the processing resource, in non-real-time and independent of and prior to a current network session between a user and an item acquisition system, can cause the execution of one or more of the trained first models 223 applied to historic features of numerous historic groupings of items, which may be stored in a database 210. Based on the execution of the first model, the processing resource 102 obtains, for each of the numerous historic groupings of items, a set of one or more carousel identifiers having particular descriptive relevance to the respective historic features of the respective historic grouping of one or more items, which produces a collection of sets of one or more carousel identifiers 230.

In some embodiments, the processing resource causes the execution of one or more trained second models 224 (e.g., LLM model) that are applied to one or more or each carousel identifier of each of the sets of one or more carousel identifiers 230 and validate a relevance of each of the carousel identifiers to the respective historic grouping of items for which the identifier is generated. The validation can in part be based on assessing coherence (e.g., the identifier makes grammatical sense and relate to the items), relevance to the items and/or is expected to entice users likely interested in those items, accuracy (e.g., identifier avoids factual errors and/or hallucinations), conciseness (e.g., avoids excessively long identifiers, identifiers are easy to understand), other such correlations, or a combination of two or more of such correlations. Some embodiments implement and/or cause an execution of an artificial intelligence identifier validation agent **225*b* that initiates validation of the relevance and accuracy of the generated identifiers though the execution of one or more second LLM models 224 to address hallucination issues, have threshold contextual relevance to at least the features of the respective grouping of items, alignment with users' interests and context with which the grouping is generated, and/or other such coherence, relevance and alignment evaluations. The validation can further take into consideration historic user information, such as but not limited to items from which the group of items were identified, related historic searching and/or browsing by users for which the group of items were associated, other such information, or a combination of such users' historic information. As such, the identifier generation system 201 in some embodiments applies a dual-agent LLM architecture with the application of cascading LLM models of a first LLM model 223 generating identifiers and subsequent second LLM model 224 validating those generated identifiers. The validated identifiers 231 can be stored in a database 108**, spreadsheet, etc.

Some embodiments determine a preliminary ranking and/or validation score of each of the one or more carousel identifiers of each of the sets of one or more carousel identifiers. The preliminary ranking may be determined by the second model 224, a ranking system 227 applying one or more ranking models and/or an application of one or more separate scoring algorithms. The ranking can be determined, in some embodiments, as a function of a relationship between the respective carousel identifier and the corresponding historic grouping of items. For example, a preliminary ranking or validation score can be provided for one or more of the validated identifiers 231 as a function of the determined validation (e.g., coherence, relevance, accuracy, conciseness, other such factors, or a combination of two or more of such factors). Some embodiments can determine respective factor scores associated with each of two or more of the factors (e.g., by the second model) and a preliminary ranking determined based on a combination of and/or weighted combination of the two or more factor scores.

The validated identifiers 231 of the sets of identifiers may be stored in one or more local and/or remote databases 108, spreadsheet, table, document, etc. Further, the sets of validated identifiers can be stored in association with the respective preliminary rankings, grouping information of the respective group with which the identifier is associated, item information of the items of the respective group with which the identifier is associated, category information of one or more categories with which the respective group and/or items are associated, and/or other such related information. Accordingly, some embodiments generate and validate, off-line and independent of any network sessions, a large pool of candidate carousel identifiers that each correspond to a historic grouping of one or more items. This pool of candidate carousel identifiers can then be readily available for use in real-time during network sessions between the item acquisition systems 101 and user computing devices 110 without the delay that would otherwise be introduced when identifier generation is executed during the session. Further, the generation, off-line of the network sessions, enables additional processing to generate more relevant identifiers and implement greater precision validation of the identifiers relative to the respective groupings of items.

The identifier generation system 201, in some embodiments, can embed, vectorize and/or otherwise process feature information for each of the historic groupings of items that can simplify and/or provide a greater accuracy in subsequently identifying groupings of items that are relevant during network sessions between the item acquisition system 101 and user computing devices 110. The identifier generation system 201, in some embodiments, can cause an execution, relative to each of the historic groupings of items, of one or more embedding models 226, and obtain, based on the embedding model, respective vectorized embeddings 232 of grouping information and/or features for one or more or each of the historic groupings of items. Again, the features can include but are not limited to item identifiers (e.g., item names), historic item context of the respective historic grouping of items, historic category identifiers of historic categories within which historic item identifiers are associated item information, and/or other such relevant information about the items and/or their associations. The embedding model can generate based on and/or convert the information of the historic groupings and categories into vector embeddings. The embeddings, in some implementations, provides one or more vectorized representations corresponding to one or more of the historic groupings, categories and/or other relevant information of the groupings. These embeddings are stored in a vector database 208, which enables efficient similarity searching in real-time.

During network sessions, the carousel generation system 200 can implement, in real-time during network sessions between the item acquisition systems 101 and numerous user computing devices 110, the session content allocation system 202 that uses network session information (e.g., current items in a user's virtual cart, recent browser history (e.g., recent products and categories considered), previous purchases, etc.) in combination with the previously generated carousel identifiers and embeddings to identify identifiers for groupings of items that is more relevant to the current network session and/or the respective user, while drastically reducing or preventing delays in providing information to the user that is more contextually relevant to the user, information and/or items being considered by a user, predicted to more likely draw the user's attention, and/or other such benefits. It is common during network sessions for a content source to identify additional items and/or content that is relevant to the current network session. As one non-limiting example, retail entities can identify a set of one or more items that are to be recommended to a user during a network session based on the user and the user's actions during the session (e.g., items considered, items added to a virtual cart, user historic preferences, etc.). Accordingly, the session content allocation system 202 attempts to use the recommended items to identify one or more pre-generated candidate carousel identifiers 230 that are relevant to the recommended items as well as being relevant to the particular user and the current network session. This allows the session content allocation system 202 to provide a highly relevant candidate identifier without the delays that would otherwise be introduced in trying to generate an identifier in real time.

During a current network session, in real-time between a user using a user computing device 110 and the item acquisition system 101, the session content allocation system 202 accesses and/or obtains, through communications over the distributed communications network 103, session context 206 corresponding to a user and a set of one or more items associated with actions initiated by the user during the current network session. The session context 206 can include but is not limited to item identifiers, item features (e.g., size, weight, quantity, color, category(ies) with which the item is associated, etc.), search terms and/or parameters submitted by a user, items in a virtual cart, items selected to view additional information ("clicked" items), user information, other such session context information, or a combination of two or more of such session context. As introduced above, the network session can comprise a user searching for information about a particular item (e.g., product(s), news, information about a person or group of people, information about an entity, pricing information, sales transaction information, financial information, entertainment information, sports information, and/or substantially any other relevant information).

In some embodiments, for example, the session context can comprise virtual cart contents, browsing history that previously occurred during a current session, browsing history that previously occurred within a threshold duration of time to the current network session, one or more historic completed orders implemented by the user through previous network sessions, recommended items and/or content corresponding to the session, and/or other such session context. In some embodiments, the processing resource 102 can identify, based on the context information (e.g., a selected set of items selected by the user during a current network session), one or more themes associated with actions initiated by the user, item information, category information and/or other such information relevant to the current session.

The processing resource 102 can implement an in-session context embedding of session content. In some embodiments, the embedding model 226 and/or one or more separate embedding models can be initiated during the network session and applied relative to the session context and/or content to obtain one or more session context embeddings 235. In some embodiments, the session embeddings can be based on a combination of two or more session context data. As a non-limiting example, some embodiments cause the embedding model 226 to be executed relative to the session context comprising a combination of session item identifiers of a set of one or more session items and one or more session category identifiers of one or more categories within which one or more of the session item identifiers are associated (e.g., concatenate item identifiers (ID) and/or category identifiers of one or more items that the user has considered and/or added to a virtual cart, and generate an embedding for the resulting string). The set of session items can include, for example but is not limited to items added to a virtual cart, items "clicked on" by the user to access additional information, items removed from a virtual cart, and/or other such items related to the current network session.

The one or more session context embeddings 235 can, in some instances, represent a user's current state and/or a current state of session interactions by the user with the item acquisition system 101. The session context embeddings can provide vectorized representations corresponding to the current network session, such as item information of one or more considered during the session.

The session content allocation system 202 can in some embodiments include one or more similarity search systems 228 that can be implemented through one or more processing resources to perform a similarity search of the collection of the sets of one or more carousel identifiers 231 based on the session context, and identify a first set of carousel identifiers, of the sets of one or more carousel identifiers, having a threshold relationship with the session context according to the similarity search. The similarity search in some embodiments is based on the session context embedding relative to the vectorized embeddings to identify one or more vectorized embeddings having a threshold relationship with some or all of the current session context embedding, with at least a first set of one or more carousel identifiers corresponding with the first vectorized embedding.

For example, using one or more session context embeddings of the current session, the processing resource can initiate, in real-time during the current network session, a similarity search system 228 through the application of one or more similarity algorithms, trained models, and/or other such methods. In some embodiments, the similarity search is performed relative to the session context embeddings 235 in relation to vector database 108 to find a set of one or more closest matching pre-generated vectorized embeddings 232 and/or one or more near neighbors of the pre-generated carousel identifiers, each corresponding to one of the historic groupings of one or more items (e.g., based on item combinations and/or categories). In some instances, a relatively large number of pre-generated carousel identifiers, generated off-line and independent of the current network session, may be identified having a threshold similarity relationship with the current session context embeddings. The processing in real-time of an excess number of identified pre-generated identifiers can often introduce undesired delays, utilize excessive processing resources, and result in other potential issues. As such, in some instances, the number of pre-generated identifiers may be limited by identifying and/or retrieving a limited set of one or more of the pre-generated identifiers having the highest preliminary ranking and that have a threshold relationship with a current session context embedding 235. The number of pre-generated identifiers of the set of pre-generated identifiers can be substantially any relevant number, and in some embodiments is limited to a threshold number based on one or more factors, such as but not limited to subsequent expected processing times associated with the pre-generated identifiers, predicted processing resource utilization, availability of processing resources, other such factors, or a combination of two or more of such factors. In some implementations, the threshold number of pre-generated identifier is predefined as a fixed number, while in other implementations the threshold number may vary over time, which may be based on the one or more factors. This initial identifier retrieval of the set of identifiers provides a smaller, more manageable set of identifiers that are further evaluated, which can improve efficiency. The processing resource 102, in some embodiments, calculates a similarity score between one or more session context embeddings and the retrieved set of pre-generated carousel identifiers. Further, in some embodiments, the pre-generated identifiers may be selected in part based on the preliminary ranking, such as but not limited to identifying the threshold number of identifiers that have the highest rankings (e.g., top N ranked pre-generated identifiers, where N corresponds to the threshold number).

Some embodiments include a ranking system 229 that can re-rank the selected set of the pre-generated identifiers identified based, for example, on a similarity analysis relative to current session context to provide a more relevant ranking of the carousel identifiers to the current network session and user. The preliminary ranking of the pre-generated identifiers does not take into account the current session context and user context for specific nuances that are expected to be of more relevance to the respective user. The re-ranking may provide a ranking in part as a function of the current session context and/or current session context embeddings, which is expected to be of more interest to the user and/or more likely to draw the user's attention and predicted to result in more user interaction (e.g., determine which of these candidate identifiers is estimated most likely to result in a selection by the user).

The ranking system 229 can be implemented through one or more processing resources, which may be the processing resources 102 or separate processing resources, that can execute instructions to evaluate the set of candidate pre-generated identifiers to make informed decisions using relevant information about the pre-generated identifiers and at least some of the current session context. Some embodiments determine a ranking of carousel identifiers of the first set of carousel identifiers as a function of identifier features of the first set of carousel identifiers and session features corresponding to the current network session. These evaluation features can include but are not limited to one or more identifier features, user-identifier interaction features, session context features, similarity features or a combination of two or more of such features. Examples of identifier features include but are not limited to characteristics of the identifier itself, such as length, sentiment (e.g., positive, negative, neutral, etc.), presence of keywords related to the session context (e.g., user context, search context, item context, etc.), use of numbers (e.g., "5 Must-Have Items"), promotional phrases (e.g., "Limited Time Offer"), and other such identifier features. The user-identifier interaction features can include but are not limited to historic user interaction, such as historical click-through rates (CTR) for candidate identifiers, specifically when historically shown to users with similar contexts. Engagement data can be of particular importance relative to the user-identifier interaction features. For example, when identifier A has historically had a high CTR for users who have hiking boots in their cart, and the current user also has hiking boots in their cart, identifier A may receive a boost. Context features can include, for example, information about the user's current session, such as but not limited to the number of items in a respective virtual cart, the categories of items a user recently browsed, the time a user spent on a site and/or considering an item, and other such context information. The similarity can be determined based on one or more algorithms, machine learning models, and/or other such evaluations. In some embodiments, the similarity is evaluated using the context embedding and retrieved carousel identifiers similarity.

The ranking system 229, in some embodiments, can utilize discounted cumulative gain (DCG) evaluations, normalized discounted cumulative gain (NDCG) evaluations, and/or other such evaluations. Further, some embodiments the processing resource can cause one or more trained machine learning ranking models 250 to be executed that can apply an expected NDCG, such as but not limited to an expected NDCG re-ranking. For example, the processing resource can cause an execution of a trained ranking model 250 relative to identifier interaction features corresponding to historic interactions by multiple other users relative the first set of carousel identifiers, context features corresponding to the current network session, and the identifier features of the respective the carousel identifiers of the first set of carousel identifiers. As one non-limiting example, the ranking model 250 can apply a normalized discounted cumulative gain (NDCG) evaluation of the first set of carousel identifiers and establish using the ranking model a ranked order of the first set of carousel identifiers as a function of expected relevance of the ranked carousel identifiers based on the user and contextual relevance to the first set of items.

The ranking model 250 can make informed evaluations using the relevant information about the pre-generated identifiers and the current session context and/or user information. The ranking model 250, trained on historical data, takes these features as input and can predict an expected NDCG score for each candidate identifier. The ranking model can be trained, in some implementations, to prioritize identifiers that are predicted to more likely result in user interaction (e.g., clicked by user) based on the relevant evaluation features.

The processing resource 102 can control the data communications transceiver 107 to transmit to a remote user computing device 110, via the distributed communications network 103, carousel content data (e.g., recommended items) in a predefined format consistent with a carousel interface in controlling the remote user computing device 110 to render, within a session layout, the carousel content data comprising the selected carousel identifier personalized for the current network session and item information of a set of items (e.g., recommended items) consistent with the carousel interface.

Figure 3:
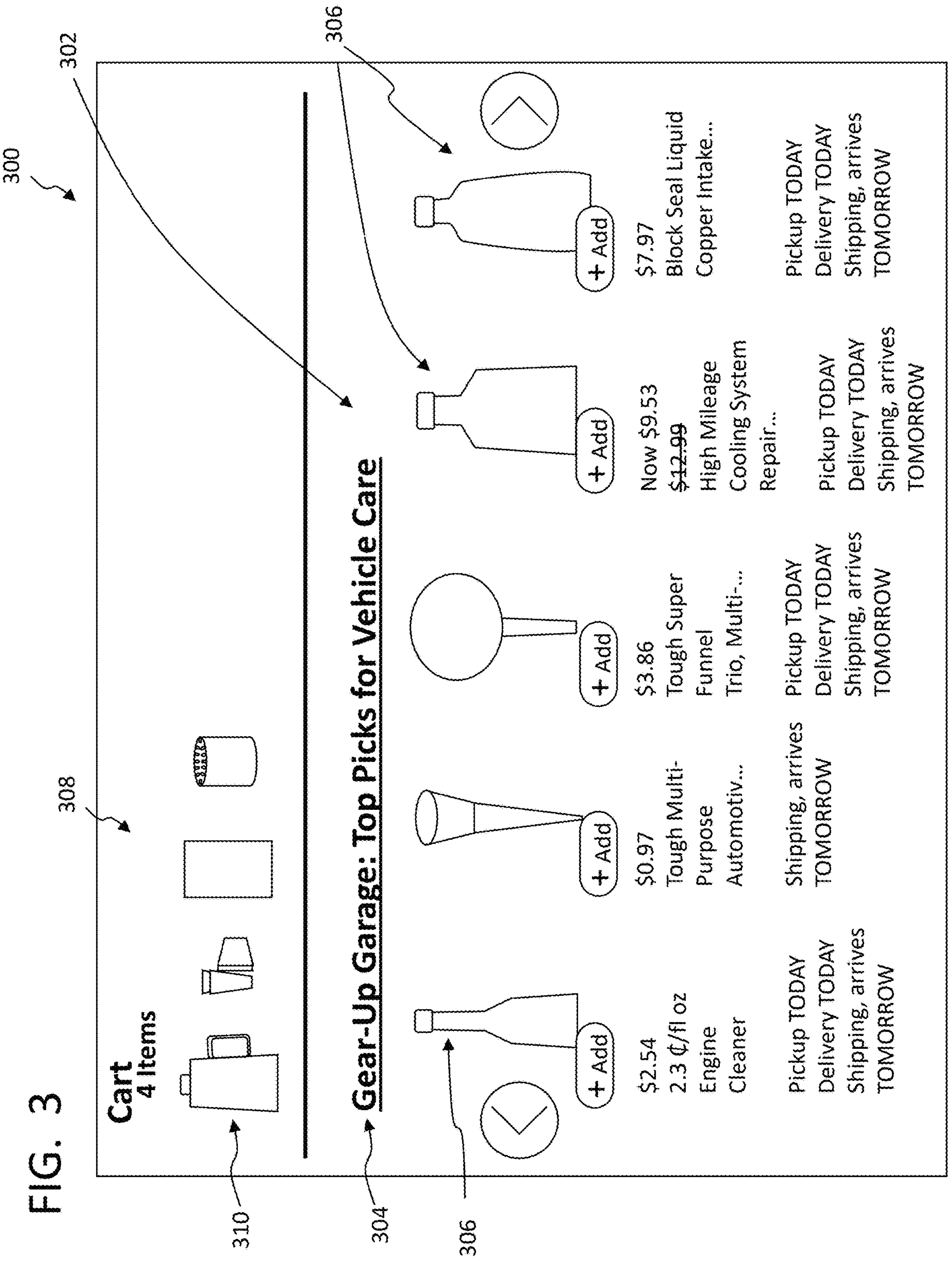
FIG. 3 illustrates a representation of an example graphical user interface (GUI) displayed according to a predefined session layout according to the intended content provided, in accordance with some embodiments.

FIG. 3 illustrates a representation of an example graphical user interface (GUI) 300 displayed according to a predefined session layout according to the intended content provided, in accordance with some embodiments. The GUI 300 automatically organizes the carousel content within the predefined layout of a carousel interface 302 that is rendered within the predefined session layout. The carousel interface 302 automatically positions the selected, contextually relevant carousel identifier 304 (which may be referred to as a carousel title or label in some embodiments) that is selected to personalize the identifier for the current session in a contextually relevant location, with the carousel interface 302 further including item information for the set of recommended items 306 that are automatically organized. The item information of the recommended items 306 can include substantially any relevant information, such as but not limited to item identifier, related category, descriptive information, other relevant information, or a combination of two or more of such relevant information. Based on the current session information (e.g., user information, items 310 in a current virtual cart 308, etc.), the more relevant carousel identifier 304 is selected from pre-generated identifiers that were previously generated prior to and independent of the current network session and relative to items consistent with the recommended items 306 and/or items 310 in the cart 308. Further, the item content can be automatically organized in some embodiments according to a determined ranking relative to the session content and/or the carousel identifier. The predefined layout enhances the identification of carousel interface 302 over previous system, at least with the addition of the specifically selected carousel identifier 304 that has a greater relevance to the cart and recommended items 306, and the is predicted to be of more interest and/or more likely result in interaction by the user.

The system can track user interaction following the control of the user device in presenting the customized carousel identifier. This feedback and/or other feedback can be used in retraining one or more of the machine learning models with the retraining producing new or modified trained models. Similarly, models can continuously be retrained based on session content received over time, including the identified groupings of items, and the relationships between those items in the groupings. The retraining of the models provides improved performance to provide carousel identifiers that are expected to be of particular relevance to a user and the current network session.

In some embodiments, one or more themes, categories or other such associations of recommended items may be identified. Such item associations are generally referred to below as theme, but it will be understood that the association can be substantially any relevant association based on one or more features, factors and/or characteristics that provide the association of the items. When two or more themes are identified, item acquisition systems 101 in some embodiments may generate multiple carousel interfaces 302, and similarly select separate carousel identifiers, from the previously generated identifiers, that are of particular relevance to each of the themes of the separate carousel interfaces 302.

Figure 4:
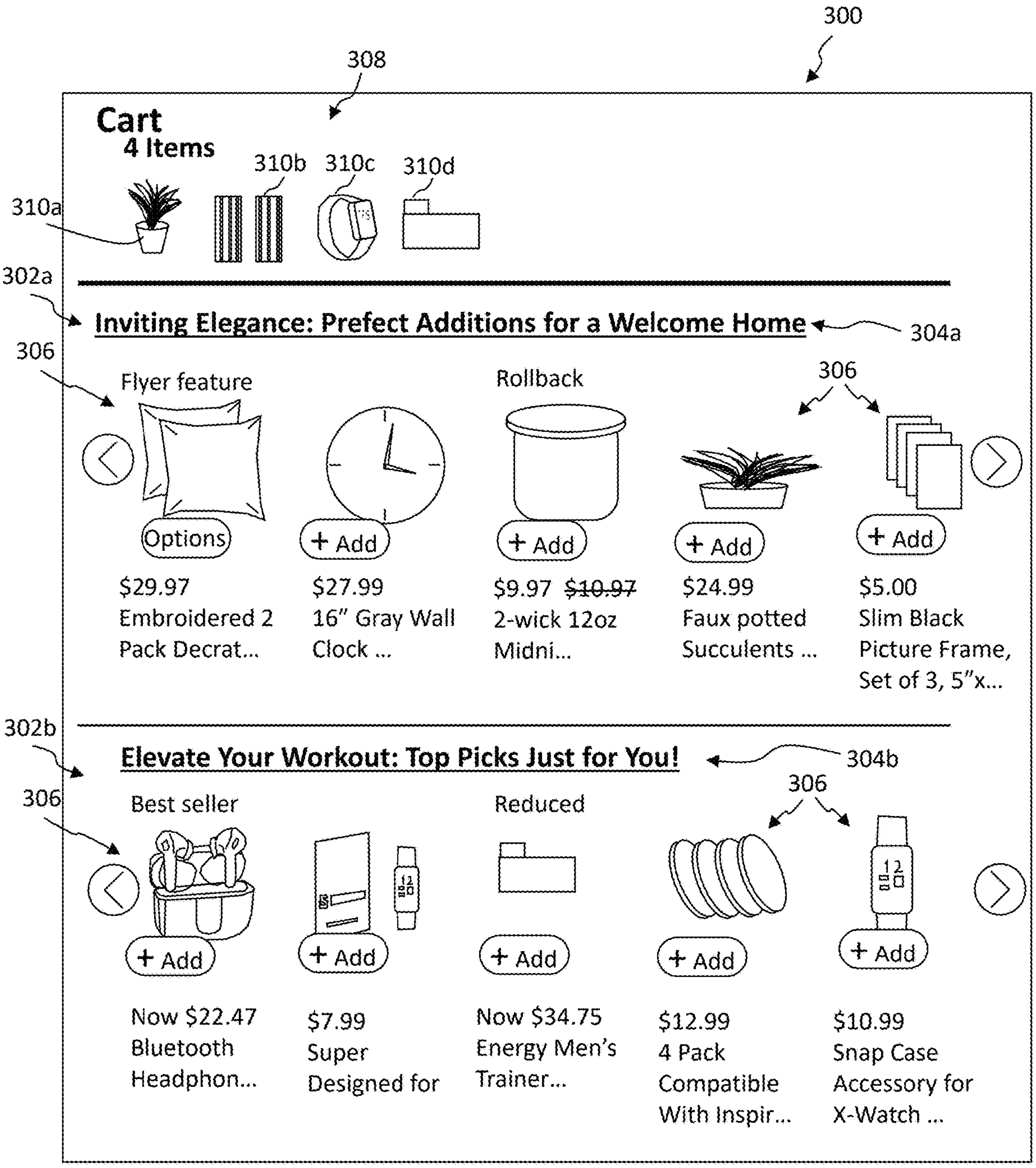
FIG. 4 illustrates a representation of an example graphical user interface (GUI) displayed according to a predefined session layout according to the intended content provided, in accordance with some embodiments.

FIG. 4 illustrates a representation of an example graphical user interface (GUI) 300 displayed according to a predefined session layout according to the intended content provided, in accordance with some embodiments. The GUI 300 includes a carousel interface 302 that is rendered within the session layout. The processing resource 102, in some embodiments, can evaluate the current session context and identify two or more themes, categories, groupings or other relevant associations. The processing resource may, for example, evaluate the items 310*a*-310*d* in the virtual cart 308, and identify multiple themes based on item information for each of the items 310 of the virtual cart. As one non-limiting example, the processing resource may determine that a first item 310*a* and second item 310*b* are associated with a first theme or category (e.g., interior home decor), and a third item 310*c* and a fourth item 310*d* are associated with a second theme or category (e.g., exercise and/or fitness). Accordingly, the processing resource 102 can implement multiple carousels, each corresponding to one of the multiple themes, that are to be rendered in the carousel interface 302, with the recommended items 306 of each of the displayed carousels corresponding to the respective theme and/or category.

Still referring to FIG. 4, the processing resource 102, during the current network session and in real-time, can identify, based on a selected set of items 310 selected by the user during the current network session, multiple themes (e.g., a first theme and a second theme). The first theme can correspond to the first set of one or more items (e.g., items 310*a*-310*b*), and a second theme can correspond to a second set of one or more items (e.g., items 310*c*-310*d*), which are typically associated with actions initiated by the user (e.g., add to cart, hover, select for further information, etc.). For each theme, a respective set of recommended items 306 can be identified. The identification of the recommended items 306 are identified based on the theme, and may further be based on other current context information, which may include current and historic user information (e.g., purchase history, preferences, location, etc.).

The similarity search systems 228 can be implemented to perform a similarity search of the collection of the pre-generated sets of one or more carousel identifiers 231 based on each of the multiple themes and other relevant session context, to identify a first set of carousel identifiers corresponding to the first theme, and identify a second set of carousel identifiers, of the pre-generated sets of one or more carousel identifiers, having a threshold relationship with the session context and corresponding to the second theme. The ranking system 229 can be implemented to re-rank the carousel identifiers of the first set of carousel identifiers as a function of the identifier features of the first set of carousel identifiers and the session features corresponding to the current network session and the first theme. Similarly, the ranking system 229 can re-rank the carousel identifiers of the second set of carousel identifiers as a function of the identifier features of the second set of carousel identifiers and the session features corresponding to the current network session and the second theme.

Using the rankings, the ranking system can identify a first carousel identifier 304*a* of the first set of carousel identifiers having an estimated highest ranked association with the current network session and the first theme (e.g., related to home decor and the current user), and identify a second carousel identifier 304*b* of the second set of carousel identifiers having an estimated highest ranked association with the current network session and the second theme (e.g., related to exercise and/or fitness and the current user). The processing resource 102 can control the data communications transceiver 107 in transmitting the carousel content data in the predefined format consistent with the carousel interface in controlling the remote user computing device 110 to render, within the session layout, two sets of the carousel content data comprising a first displayed carousel 302*a* that includes the first carousel identifier 304*a* positionally associated with the item information of the first set of items 306, and a second displayed carousel 302*b* comprising the second carousel identifier 304*b* positionally associated with the second set of items 306*b* consistent with the carousel interface.

Figure 5A:
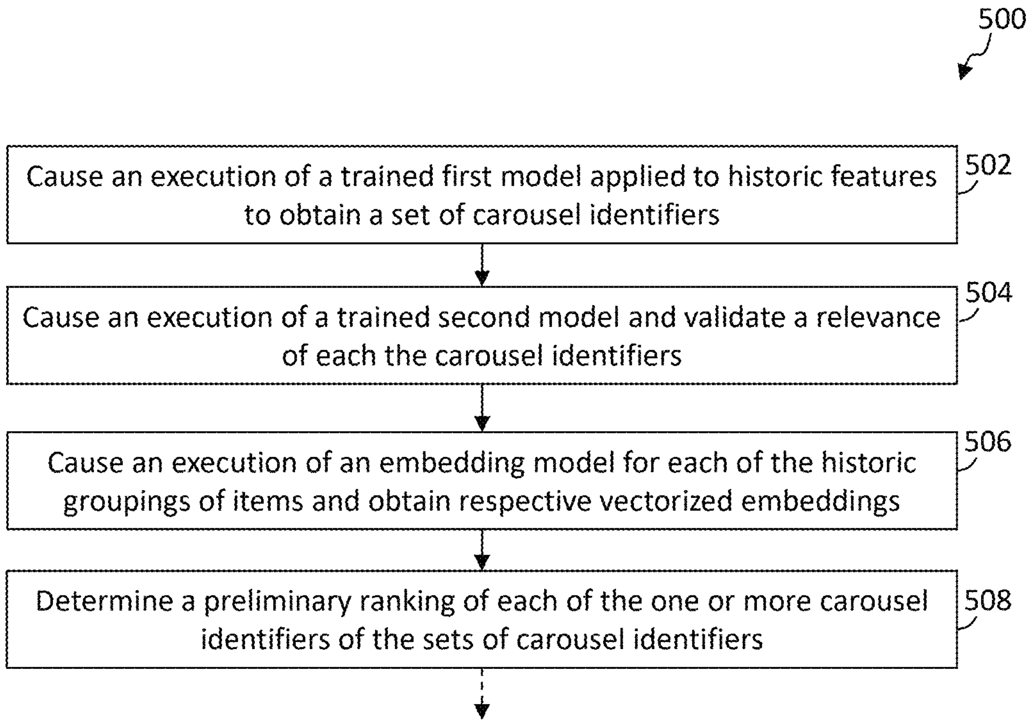
FIG. 5A illustrates a flow diagram of an example non-real-time process in controlling digital communications between electronic system components over a distributed network, in accordance with some embodiments.

FIG. 5A illustrates a flow diagram of an example non-real-time process 500 in controlling digital communications between electronic system components over a distributed network, in accordance with some embodiments. In step 502, one or more processing resources 102, executing instructions stored on a machine readable medium, can cause an execution of a trained first model 223 to be applied to historic features of numerous historic groupings of items stored in a database, to obtain a set of one or more carousel identifiers having particular descriptive relevance to the respective historic features of the respective historic grouping of items in the database, producing a collection of sets of one or more carousel identifiers. Some embodiments cause, in step 504, an execution of a trained second model 224 applied to each carousel identifier of the sets of one or more carousel identifiers and validate, by the processing resource using the second model, a relevance of each the carousel identifiers to the respective historic grouping of items.

Some embodiments include step 506 where the process causes, for each of the historic groupings of items, an execution of an embedding model 226 relative to the respective historic grouping of items, and obtain respective vectorized embeddings for each of the historic groupings of items. The causing the execution of the embedding model relative to each of the historic groupings of items, in some implementations, can include causing the execution of the embedding model applied to historic item context of the respective historic grouping of items and historic category identifiers of historic categories within which historic item identifiers are associated. In step 508, a preliminary ranking is determined of each of the one or more carousel identifiers of each of the sets of one or more carousel identifiers as a function of similarity between the respective carousel identifier and the corresponding historic grouping of items. Typically, steps 502, 504, 506 and 508 are implemented in non-real-time, and independent of any network sessions. As described above, this enables enhanced processing without the introduction of undesired delays during the sessions.

Figure 5B:
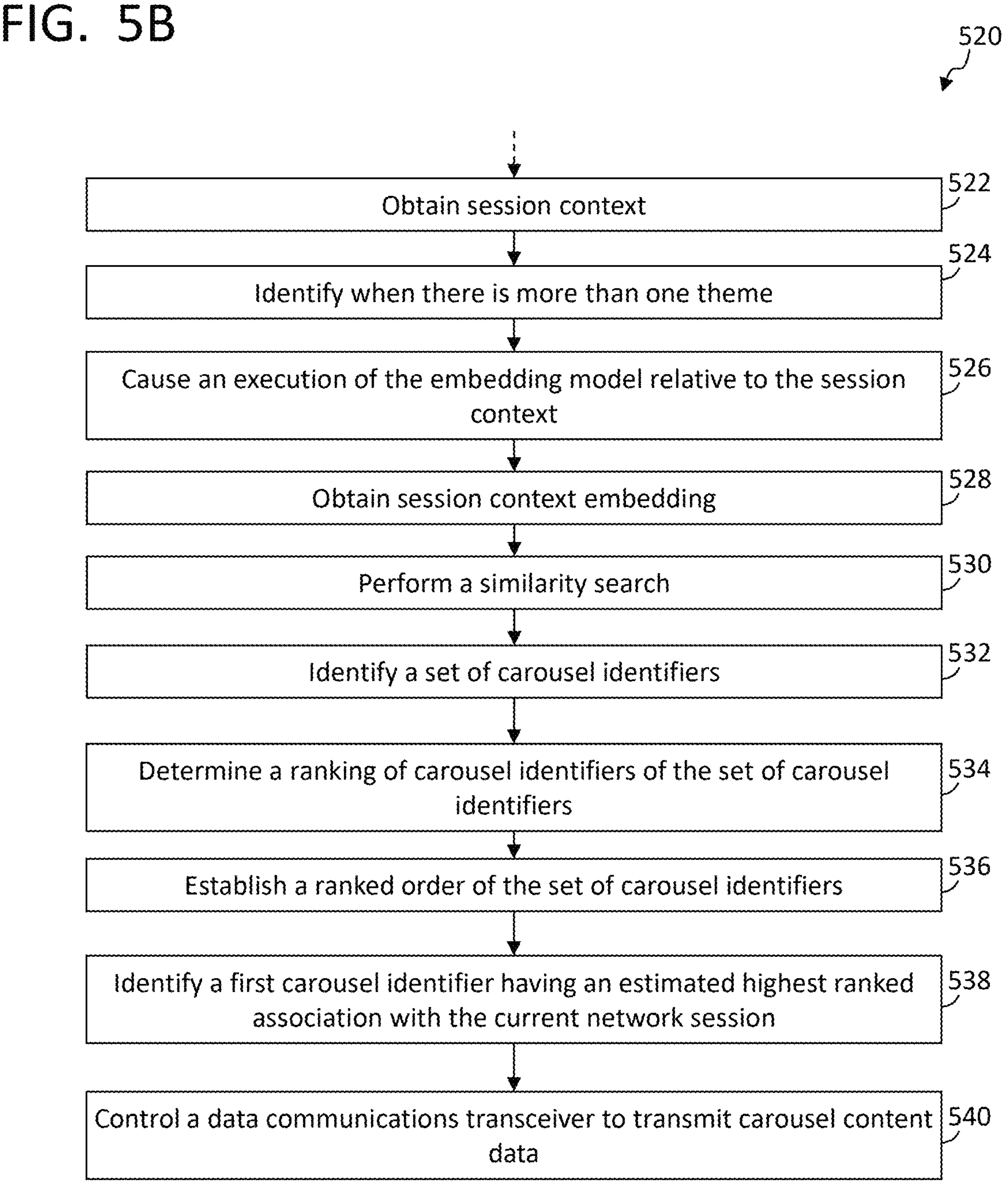
FIG. 5B illustrates a flow diagram of an example real-time process in controlling digital communications between electronic system components over a distributed network, in accordance with some embodiments.

FIG. 5B illustrates a flow diagram of an example real-time process 520 in controlling digital communications between electronic system components over a distributed network, in accordance with some embodiments. The process 520 can, in some embodiments, utilize the content from the non-real-time process 500 of FIG. 5A. In step 522, session context is obtained during the current network session, in real-time, between the user and the item acquisition system through communications over one or more distributed communications networks 103. The session context can correspond to a first set of one or more items associated with actions initiated by the user during the current network session. In some embodiments, the session context comprises virtual cart contents, browsing history that previously occurred within a threshold duration of time to the current network session, and one or more historic completed orders implemented by the user through previous network sessions. Some embodiments include step 524, where the session data can be evaluated to identify, based on a selected set of items selected by the user during the current network session, where there is more than one theme. For example, the processing resource can identify a first theme corresponding to the first set of items and one or more additional themes (e.g., a second theme corresponding to a second set of items associated with actions initiated by the user).

In step 526, the process can cause the embedding model 226 to be executed and applied relative to the session context. In step 528, based on the application of the embedding model to the session context, a session context embedding is obtained of the session context. In some embodiments, the causing the execution of the embedding model comprises causing the execution of the embedding model applied relative to a combination of session item identifiers of a set of session items and session category identifiers of categories within which the session item identifiers are associated, to obtain the session context embedding.

In step 530, some embodiments perform a similarity search in the collection of the sets of one or more carousel identifiers stored in the database 108 based on the session context. In step 532, a first set of carousel identifiers, of the sets of one or more carousel identifiers, is identified that has a threshold relationship with the session context according to the similarity search. The similarity search, in some embodiments, can include performing the similarity search based on the session context embedding relative to the vectorized embeddings, and identify a first vectorized embedding having a threshold relationship with the session context embedding. The first vectorized embedding corresponds to the first set of carousel identifiers. Further, in identifying the first set of carousel identifiers, some embodiments select a threshold number of carousel identifiers as a function of the preliminary ranking of each of the carousel identifiers of the first set of carousel identifiers and/or the multiple sets of carousel identifiers of the collection of sets of one or more carousel identifiers. In some embodiments, when more than one theme is detected, the similarity search can be repeated to identify the first set of carousel identifiers corresponding to the first theme, and identifying one or more additional sets of carousel identifiers (e.g., a second set of carousel identifiers), of the sets of one or more carousel identifiers, having a threshold relationship with the session context and corresponding to the second theme.

In step 534, some embodiments determining a ranking of carousel identifiers of the first set of carousel identifiers as a function of identifier features of the first set of carousel identifiers and session features corresponding to the current network session. The determining of the ranking of the identifiers of the first set of carousel identifiers, in some embodiments, comprises causing an activation of a trained ranking model 250 relative to identifier interaction features corresponding to historic interactions by multiple other users relative the first set of carousel identifiers and/or similar set of carousel identifiers, context features corresponding to the current network session, and the identifier features of the respective the carousel identifiers of the first set of carousel identifiers. The ranking model 250, in some implementations, comprises a normalized discounted cumulative gain (NDCG) that is applied relative to the first set of carousel identifiers. Further, in some embodiments when more than one theme is identified, the ranking can include determining a ranking of carousel identifiers of one or more sets of carousel identifiers (e.g., a second set of carousel identifiers) as a function of the identifier features of the set of carousel identifiers and the session features corresponding to the current network session and the respective additional theme (e.g., second theme).

The process 520, in some embodiments, includes step 536, where a ranked order of the first set of carousel identifiers is established, using the ranking model, as a function of expected relevance of the ranked carousel identifiers based on the user and contextual relevance to the first set of items. Similarly, a ranked order can be established for each additional theme. In step 538, a first carousel identifier of the first set of carousel identifiers is identified having an estimated highest ranked association with the current network session. Step 538 can be repeated for each theme when multiple themes are identified and intended to be processed. For example, a second carousel identifier can be identified of the second set of carousel identifiers having an estimated highest ranked association with the current network session and the second theme. In step 540, a data communications transceiver 107 is controlled by the processing resource 102 to transmit to the remote user computing device 110, via the distributed communications network 103, carousel content data in a predefined format consistent with a carousel interface in controlling the remote user computing device to render, within a session layout, the carousel content data comprising the first carousel identifier personalized for the current network session and item information of the first set of items consistent with the carousel interface. This control can include controlling the data communications transceiver in the transmitting the carousel content data, in transmitting the carousel content data in the predefined format consistent in controlling the remote user computing device to render, within the session layout, two or more sets of the carousel content data comprising a first displayed carousel comprising the first carousel identifier positionally associated with the item information of the first set of items and one or more additional displayed carousels (e.g., a second displayed carousel) comprising a respective carousel identifier (e.g., the second carousel identifier) positionally associated with the respective set of items (e.g., second set of items) consistent with the carousel interface.

Some embodiments perform a cold start semantic similarity ranking, such as when there is insufficient current session context available. The semantic similarity ranking can determine semantic similarities between a pre-generated and verified identifier 231 and items in a virtual cart and/or item recommendations. A similarity function Sim can be used that can be based on cosine similarity between embeddings, for instance, according to:

$$Sim(T_i,I_j)=v_{Ti}\cdot v_{Ij}/\|v_{Ti}\|\|v_{Ij}\|,$$

where embeddings for a generated identifier $T_i$ is designated by $v_{Ti}$, and embeddings of an item $I_j$ in the cart/recommendations is denoted $v_{Ii}$. This similarity score can be used to rank how well a generated identifier matches the cart and/or recommendation items, when an insufficient amount of current session context.

When sufficient session context is available (e.g., engagement data), recommended items (I) can be re-ranked using various features, which may include semantic similarities, user feedback, engagement data and/or other relevant data. The ranking may be improved using the expected NDCG (xNDCG), in attempts to maximize an expected relevance of the ranked items based on user behavior and contextual relevance. A scoring function of the recommended item re-ranking, in some embodiments, can be defined for an item $I_j$ by:

$$\mathrm{Score}(I_j)=\alpha_1\cdot Sim(T_i,I_j)+\alpha_2\cdot E_j+\alpha_3\cdot C_j,$$

where $\alpha_1$, $\alpha_2$, $\alpha_3$ are learned weights from the ranking model 250, $E_j$ represents engagement metrics for item $I_j$ (e.g., clicks, hovers, add-to-cart, etc.), $C_j$ represents contextual relevance based on session context (e.g., recent user behavior, cart content, etc.), and $Sim(T_i,I_j)$ represents a semantic similarity between the generated identifier $T_i$ and the item $I_j$.

Some embodiments can additionally or alternatively optimize recommended item rankings using an expected NDCG (xNDCG) as an objective function. For example, an xNDCG score for ranked list of items may be defined by:

$$xNDCG(L) = \sum_{j=1} \frac{E[\text{relevance}_j]}{\log_2(j+1)}$$

where $E[\text{relevance}_j]$ is the expected relevance of item $I_j$, which can be modeled using predicted engagement metrics or user interaction probabilities (e.g., click-through rates), and j is the rank position of the item in the list, and the result may be discounted logarithmically by $\log_2(j+1)$, placing higher importance on items with higher rankings (e.g., at the top of the list).

Some embodiments, in ranking candidate identifiers and recommended items, generate an initial set of ranked candidate carousel identifiers for each user session using the similarity function and contextual features. An expected relevance can be computed for each recommended item in a list based on user behavior, engagement metrics, and contextual information (e.g., session data, cart content, etc.). Expected NDCG can be used to re-rank the items (*I*). This can be achieved by calculating the relevance of the items at different ranks and maximizing the expected NDCG score. The re-ranked list can be used in presenting the items organized according to the re-ranking in the carousel according to the optimized scoring, and displayed in cooperation with the display of the selected carouse identifier that is expected to have significant relevance to the user and the current session. By optimizing for Expected NDCG (xNDCG), some embodiments effectively tailor the ranking of items to user preferences, maximizing engagement and relevance based on predicted outcomes. The ideal relevance may be inherent in the normalization of the score, ensuring the system produces as relevant and engaging a list as possible.

Figure 6:
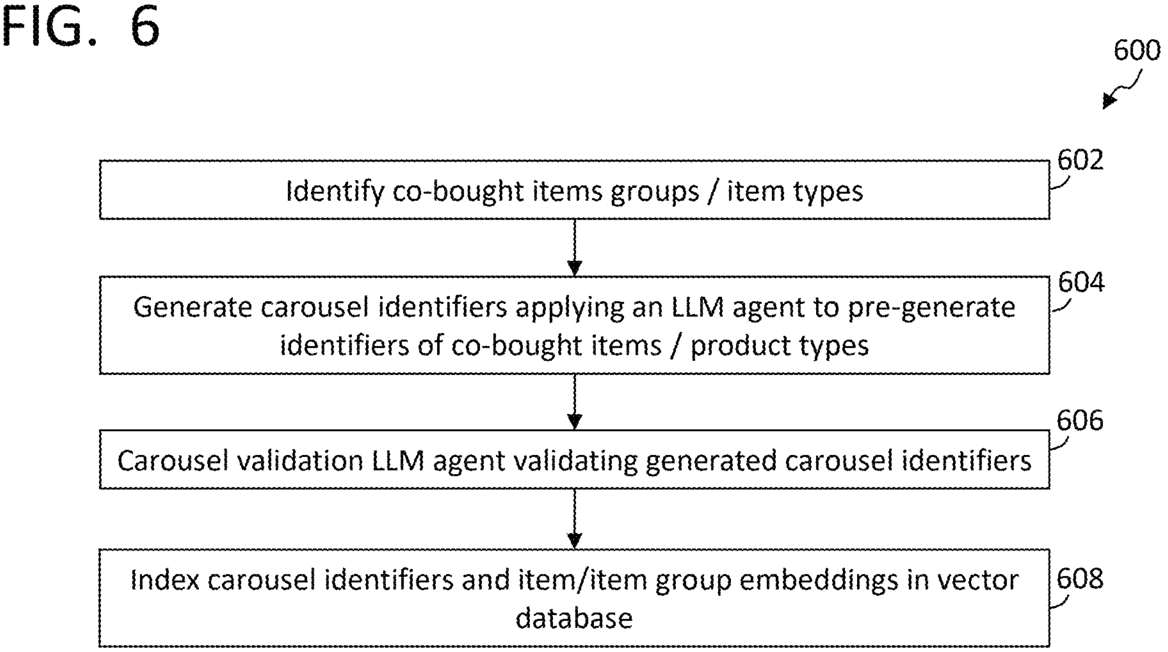
FIG. 6 illustrates a flow diagram of an example process of providing indexed groupings of carousel identifiers, in accordance with some embodiments.

FIG. 6 illustrates a flow diagram of an example process 600 of providing indexed groupings of carousel identifiers, in accordance with some embodiments. The process 600 can be implemented independent of network sessions. In step 602, carousel identifiers can be generated. This can include identifying groupings and/or combinations of items that are frequently combined (e.g., analyze historical order/cart data to identify frequently co-occurring items and categorize them). A library of groupings (e.g., common purchase patterns) can be created and maintained over time with updates to continue to be current. Some embodiments additionally include category-level combinations, which can include combinations for less frequent items. In step 604, candidate identifiers can be generated. Some embodiments employ a carousel identifier generation agent 225*a* that, for each identified item combination and/or category, causes an execution of the trained large language first model 223 to generate multiple candidate carousel identifiers. The agent can provide the model with clear prompts including the item, group and/or category information (example prompt: "Generate 5 engaging carousel identifiers for a user who has added [item1] and [item2] to their cart, belonging to categories [category1] and [category2]."

In step 606, the generated candidate identifiers are validated and ranked Identifiers. Some embodiments implement a carousel identifier validation agent that causes an execution of a separate trained large language second model 224 to assess the generated identifiers. The validation can be based on, for example, but not limited to one or more of coherence (e.g., does the identifier make grammatical sense and relate to the items), relevance (e.g., does the identifier entice users likely interested in those items), accuracy (e.g., does the identifier avoid factual errors and/or hallucinations), conciseness (e.g., is the identifier short and easy to understand), other such factors, or a combination of two or more of such factors. The validated candidate identifiers can be ranked and stored in a database 108. Typically, the validated identifiers are stored in association with their corresponding item combinations and/or categories. When ranked, some embodiments additionally store in association with the identifier a corresponding score or ranking from the validation step.

Some embodiments include step 608 where embeddings (e.g., vector representations) are generated for the item combinations and/or categories. The embeddings can be generated in some embodiments by causing an execution of one or more embedding models 226. The embeddings can be stored in a vector database 208 for subsequent efficient similarity searching.

Figure 7:
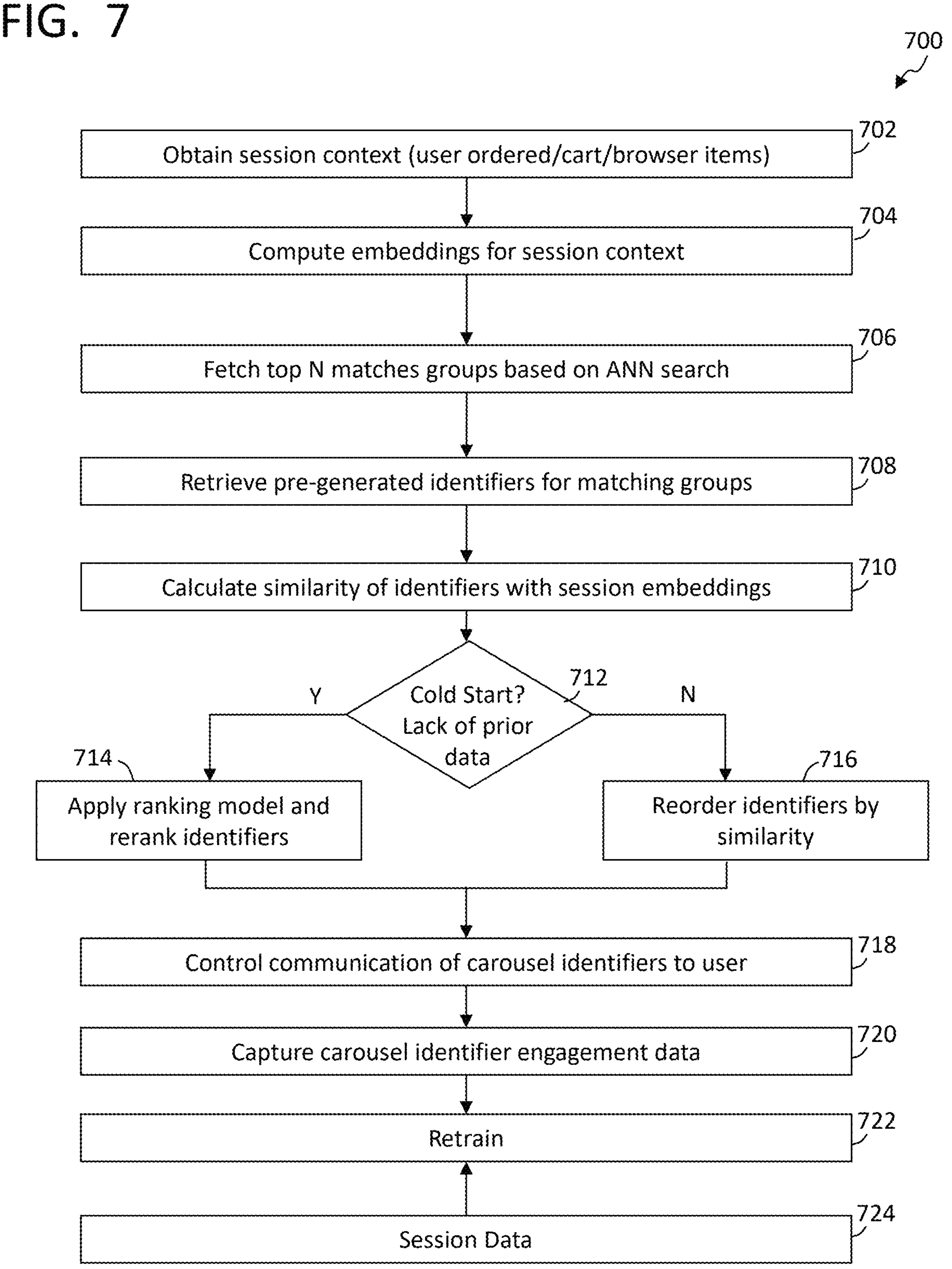
FIG. 7 illustrates to process to control digital communications between electronic system components over a distributed network, in accordance with some embodiments.

FIG. 7 illustrates to process 700 to control digital communications between electronic system components over a distributed network 103, in accordance with some embodiments. The process 700 is typically implemented in real-time during a network session. In step 702, relevant session context information is acquired. The session context information can include, but is not limited to, cart contents of one or more items currently in a user's virtual cart, recent browsing history regarding items and/or categories recently viewed, historic purchases by the user, which may include purchases based on selections from recommended items. In step 704, session context embedding is generated from a combination of some or all of the session context information (e.g., concatenate item identifiers and category identifiers, and generate an embedding of the resulting string). In step 706, a similarity search in the vector database 208 is performed to find one or more closest matching pre-generated item combinations of items and/or item categories based on the session context embedding In step 708, a set of highest N ranked pre-generated identifiers corresponding to the combinations and/or categories identified from the similarity search. In some embodiments, the N ranked pre-generated identifiers may be less than the number of identifiers identified. This initial identification of a reduced number of identifiers can in some implementations provide a smaller, more manageable set of identifiers for subsequent processing, which can improve efficiency. In step 710, similarities are calculated between session context embedding and the N retrieved carousel identifiers. In step 712, it is determined whether there is a threshold amount of existing historic carousel interaction data for the identified N carousel identifiers (e.g., click-through-rates (CTR), purchases, etc.). When there is existing carousel interaction data the process advances to step 714 where a re-ranking of the identified carousel identifiers is performed. Some embodiments can prepare for the application of an expected NDCG re-ranking, which can include a determination of which candidate identifiers are estimated to most likely result in a selection or click. The Expected NDCG re-ranking can use item and/or session features such as but not limited to identifier features, user-identifier interaction features, context features, similarity, other such features, or a combination of two or more of such features. The identifier features can comprise characteristics of a carousel identifier itself, such as length, sentiment (e.g., positive, negative, neutral), presence of keywords related to the user's context, use of numbers (e.g., "5 Must-Have Items"), promotional phrases (e.g., "Limited Time Offer"), and/or other such features. The user-identifier interaction features can include for example engagement data, such as historical click-through rates (CTR) for each candidate identifier, specifically when shown to users with similar contexts. The context features can include information about a user's current session, such as the number of items in their cart, the categories of items recently browsed, and the time spent on a site, etc. The similarity can, for example, be based on context embedding and identified carousel identifiers similarity. The expected NDCG re-ranking model, which is trained on historical data, takes these features as input and predicts an expected NDCG score for each candidate identifier, as a function ranking quality, considering the relevance and the position of the items. The trained re-ranking model can learn to prioritize identifiers, such as prioritize identifiers that are likely to be clicked based on the provided features.

When it is determined in step 712 that there are insufficient quantities of carousel interaction data, the process 700 can advance to step 716 where some or all of the identified carouse identifiers can be re-ranked as a function of similarity scores from step 710 of the similarity between session context embedding and the N retrieved carousel identifiers. Some embodiments may, when a suitable pre-generated identifier is not found that corresponds to the current session context, fall back to real-time identifier generation using the first model 223, while applying stricter time constraints. In step 718, a highest-ranking carousel identifier (e.g., highest expected NDCG score) is identified and the transceiver 107 is controlled to communicate at least the identified carousel identifier in controlling the graphical user interface. The process 700, in some embodiments, may include step 720 where carousel identifier engagement data is captured based on user interaction with the GUI 300. This information can be used as feedback, such as but not limited to subsequent model training.

In some embodiments, the process 700 may further include step 722 where one or more of the models (e.g., first model 223, second model 224, embedding model 226, ranking model 250, etc.), are retrained based on feedback 724, which can include subsequent session context from subsequent user interactions and/or non-interactions relative to the displayed carousel interface 302 and contents of the carousel interface. The retraining can be based on monitoring performance (e.g., CTR, conversion rate, average order value (AOV), etc.), conducted testing over time of processes 600 and 700 with different identifier variations and prompting strategies to optimize the system.

Figure 8:
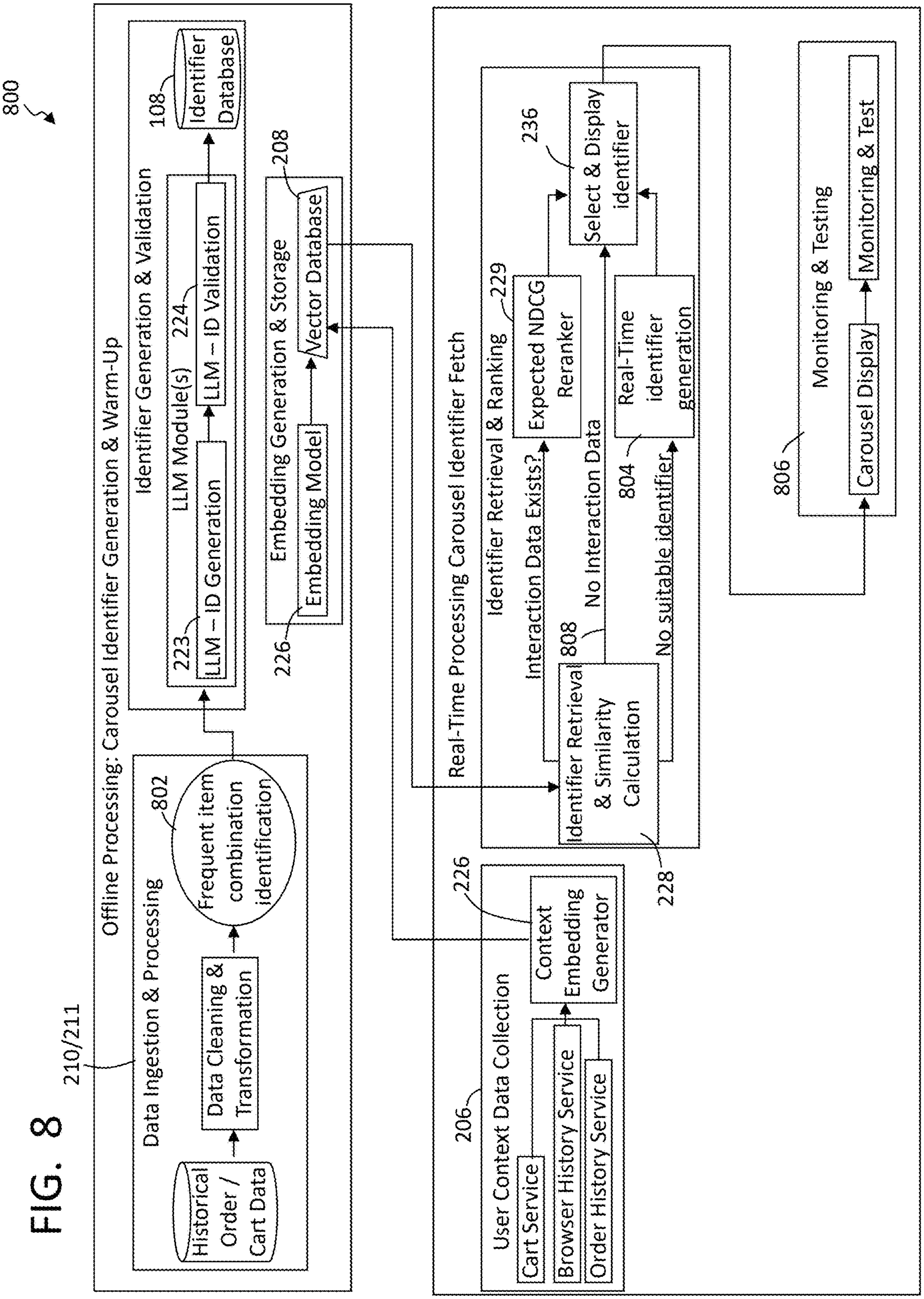
FIG. 8 illustrates a block diagram of an example carousel identifier generation system architecture, in accordance with some embodiments.

FIG. 8 illustrates a block diagram of an example carousel identifier generation system architecture 800, in accordance with some embodiments, which may incorporate and/or interoperate with elements of example carousel generation system 200 as described below. The system can provide a hybrid approach to carousel identifier generation, combining offline pre-generation that is independent of current sessions, with real-time retrieval and ranking for personalized recommendations. The system can leverage machine learning techniques, such as LLMs and embedding models, to create engaging and relevant identifiers. The off-line process provides carousel identifier generation. This phase prepares the system for real-time operation by generating and validating a large pool of carousel identifiers. Historic data 210, 211 is ingestion and processed, such as historical orders, historic carts, historic click-through data, and/or other relevant historic data, which may be cleaned and transformed, and used to identify frequent item combinations (e.g., combinations of items purchased together, combinations of items considered by a threshold number of users, combinations of items linked by similar descriptions and/or categories, combinations of items recommended together, and other such categories). The frequent item combinations provide at least part of a basis for identifier generation. For example, some embodiments identify frequent item combination identifications 802, such as items frequently purchased items together (e.g., "shoes" and "socks"), category-level combinations, and/or other such combinations.

The identifier generation and validation can apply LLMs in the identifier generation. The item combination information 802 is used by the first model 223 to generate sets of one or more candidate identifiers. The separate second model 224 can validate the generated sets of identifiers, which can be based on one or more of assessing coherence, relevance, accuracy, conciseness and/or other such factors. The validated and ranked identifiers can be stored in a database 108. The validated identifier can, in some embodiments, be stored along with their associated item combinations and scores. Some embodiments implement an embedding generation and storage where item combinations and categories are converted into vector embeddings using an embedding model 226. These embeddings can be stored in a vector database 208 for efficient similarity searching in real-time.

During a current network session, the system provides real-time processing based in part on the current session context 206. The system can gather historic and real-time session data, including cart contents, recent browsing history, order history, items considered, etc. In some embodiments the some or all of the session context information can be converted into a context embedding using the same or different embedding model 226, which may represent the user's current state. The carousel identifier fetch phase focuses on retrieving and presenting what is determined to be an estimated most appropriate identifier for a given session context. The context embedding is used to perform a similarity search in the vector database. The system retrieves the N similar pre-generated item combinations estimated to be most similar to the context embedding. A similarity between the context embedding and retrieved carousel identifiers can be calculated. The identified N identifiers may be ranked. In some instances when relevant interaction data exists for carousel identifiers, the system uses an Expected NDCG relevance ranker 229 to refine the ranking. This re-ranking can take into account one or more features as input (identifier features, user-identifier interaction features, context features, similarity scores, etc.) to predict which identifier is most likely to result in user interaction (e.g., a click). In some embodiments historical data is used to learn the best ranking, with feedback over time used to generate retrained models that are expected to provide more accurate results. In other instances, when no interaction data is available 808, similarity scores may be used to rank the identifiers instead. Further, in some embodiments, when insufficient and/or no suitable pre-generated identifiers are found, the system can fall back to real-time LLM identifier generation 804. The highest-ranked identifier 236 (either from the ranking system or the similarity-based ranking) can be selected and communicated to control the user computing device to displayed on the carousel interface with the identified contextually relevant carousel identifier. In some implementations, multiple ranked identifiers 236 are identified and communicated, such as based on multiple themes. Some embodiments monitor 806 the process and feedback performance of the identifiers (e.g., click-through rate, conversion rate) and uses testing to continuously optimize the system and improve identifier selection. The architecture is designed to provide efficiency and personalization. The offline phase creates a large library of high-quality candidate carousel identifiers, significantly reducing the load on the real-time system. The real-time phase uses efficient similarity search and machine learning-based ranking to personalize the carousel experience for each user. The fallback mechanism for real-time generation ensures that an identifier can be made available, even for unusual user contexts. The continuous monitoring and testing contribute to ongoing optimization and improvement over time of the system.

Figure 9:
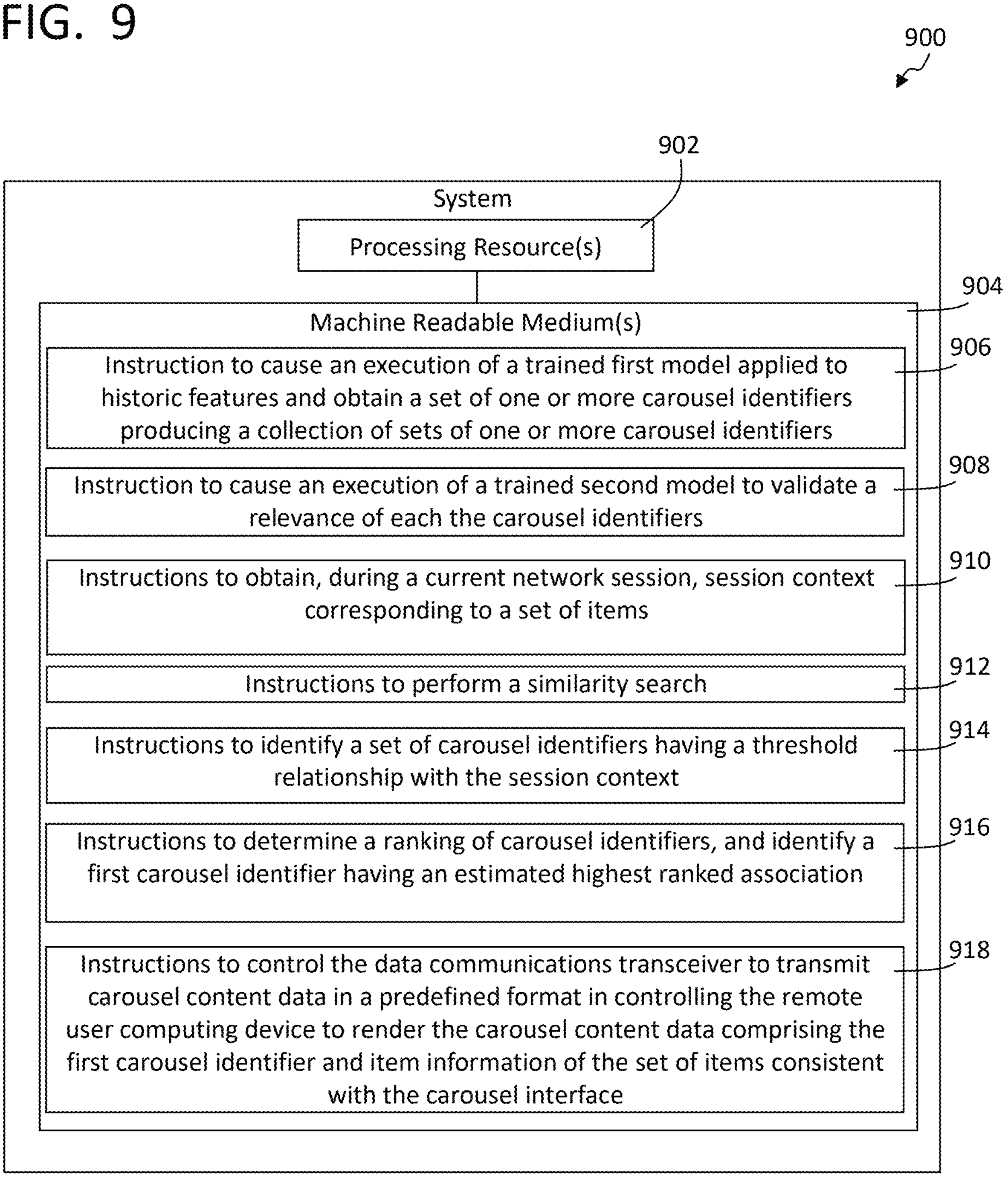
FIG. 9 depicts example system that includes one or more non-transitory, machine readable media encoded with example instructions executable by one or more processing resources, in accordance with some embodiments.

FIG. 9 depicts example system 900 that includes one or more non-transitory, machine readable media 904 encoded with example instructions executable by one or more processing resources 902, in accordance with some embodiments. In some embodiments, the system 900 may be useful for implementing aspects of the communications control system 100 and/or the one or more processing resources 102, and/or in performing some or all aspects of the processes 500, 520, 600 and/or 700 of FIGS. 5A-7, respectively. For example, the instructions encoded on machine readable media 904 may be included in instructions 106. In some implementations, functionality described with respect to FIGS. 1-2 and 8 may be included in the instructions encoded on machine readable media 904.

The one or more processing resources 902 may include a microcontroller, a microprocessor, central processing unit core(s), an ASIC, an FPGA, and/or other hardware device suitable for retrieval and/or execution of instructions from the machine readable media 904 to perform functions related to various examples. Additionally or alternatively, the processing resources 902 may include or be coupled to electronic circuitry or dedicated logic for performing some or all of the functionality of the instructions described herein.

The machine readable media 904 may be any medium suitable for storing executable instructions, such as RAM, ROM, EEPROM, flash memory, a hard disk drive, an optical disc, or the like. In some example implementations, the machine readable media 904 may be a tangible, non-transitory medium. The machine readable media 904 may be disposed within the system 900, in which case the executable instructions may be deemed installed or embedded on the system. Additionally or alternatively, some or all of the machine readable media 904 may be one or more remote, external to and/or portable storage medium, and may be part of an installation package.

As described further herein, the machine readable media 904 may be encoded with a set of executable instructions. It should be understood that part or all of the executable instructions and/or electronic circuits included within one box may, in alternate implementations, be included in a different box shown in the figures or in a different box not shown. Some implementations may include more or fewer instructions than are shown in FIG. 9.

With reference to FIG. 9, the machine readable media 904 includes instructions 906, 908, 910, 912, 914, 916. Instructions 906, when executed, cause the processing resource 902, independent of a current network session between a user and an item acquisition system, to cause an execution of a trained first model applied to historic features of numerous historic groupings of items stored in a database and obtain, for each of the numerous historic groupings of items based on the application of the first model, a set of one or more carousel identifiers having particular descriptive relevance to the respective historic features of the respective historic grouping of items, producing a collection of sets of one or more carousel identifiers. Instructions 908, when executed, cause the processing resource 902 to cause an execution of a trained second model applied to each carousel identifier of the sets of one or more carousel identifiers and validate a relevance of each the carousel identifiers to the respective historic grouping of items.

Instructions 910, when executed during the current network session in real-time between the user and the item acquisition system, cause the processing resource 902 to obtain session context corresponding to a first set of items associated with actions initiated by the user during the current network session. Instructions 912, when executed, cause the processing resource 902 to perform a similarity search in the collection of the sets of one or more carousel identifiers based on the session context. Instructions 914, when executed, cause the processing resource 902 to identify a first set of carousel identifiers, of the sets of one or more carousel identifiers, having a threshold relationship with the session context according to the similarity search. Instructions 916, when executed, cause the processing resource 902 to determine a ranking of carousel identifiers of the first set of carousel identifiers as a function of identifier features of the first set of carousel identifiers and session features corresponding to the current network session, and identify a first carousel identifier of the first set of carousel identifiers having an estimated highest ranked association with the current network session. Instructions 918, when executed, cause the processing resource 902 to control the data communications transceiver to transmit to a remote user computing device, via the distributed communications network, carousel content data in a predefined format consistent with a carousel interface in controlling the remote user computing device to render, within a session layout, the carousel content data comprising the first carousel identifier personalized for the current network session and item information of the first set of items consistent with the carousel interface.

Figure 10:
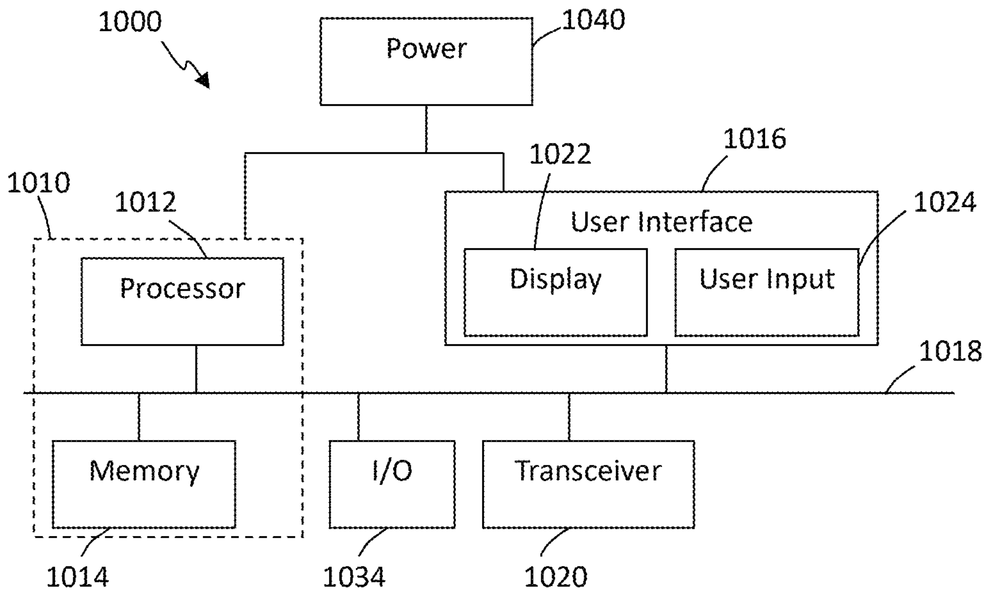
FIG. 10 illustrates an example system for use in implementing methods, techniques, devices, apparatuses, systems, servers, sources and providing control of digital communications in controlling user computing devices and the allocation of relevant content, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 10 illustrates an example system 1000 that may be used for implementing any of the components, processing resources, circuits, circuitry, systems, functionality, logic, apparatuses, processes, and/or devices of the communications control system 100, carousel generation system 200, user computing devices 110, and/or other above or below mentioned systems or devices, or parts of such circuits, circuitry, functionality, systems, apparatuses, processes, or devices. However, the use of the system 1000 or any portion thereof is certainly not required.

By way of example, the system 1000 may comprise one or more processor resources 1012 (sometimes referred to as control circuits), one or more memory 1014, and one or more communication links, paths, buses or the like 1018. Some embodiments may include one or more user interfaces 1016, and/or one or more internal and/or external power sources or supplies 1040. The control circuit 1012 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1012 can be part of control circuitry and/or a control system 1010, which may be implemented through one or more processors with access to one or more memory 1014 that can store instructions, code and the like that is implemented by the control circuit and/or processors to implement intended functionality. In some applications, the control circuit and/or memory may be distributed over a communications network 103 (e.g., LAN, WAN, Internet, cellular, etc.) providing distributed and/or redundant processing and functionality. Again, the system 1000 may be used to implement one or more of the above or below, or parts of, components, circuits, systems, processes and the like.

The user interface 1016 can allow a user to interact with the system 1000 and receive information through the system. In some instances, the user interface 1016 includes a display 1022 and/or one or more user inputs 1024, such as buttons, touch screen, track ball, keyboard, mouse, etc., which can be part of or wired or wirelessly coupled with the system 1000. Typically, the system 1000 further includes one or more communication interfaces, ports, transceivers 1020 and the like allowing the system 1000 to communicate over a communication bus, a distributed computer and/or communication network 103 (e.g., a local area network (LAN), the Internet, wide area network (WAN), etc.), communication link 1018, other networks or communication channels with other devices and/or other such communications or combination of two or more of such communication methods. Further the transceiver 1020 can be configured for wired, wireless, optical, fiber optical cable, satellite, or other such communication configurations or combinations of two or more of such communications. Some embodiments include one or more input/output (I/O) ports 1034 that allow one or more devices to couple with the system 1000. The I/O ports can be substantially any relevant port or combinations of ports, such as but not limited to USB, Ethernet, or other such ports. The I/O interface 1034 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

The system 1000 comprises an example of a control and/or processor-based system with the control circuit 1012. Again, the control circuit 1012 can be implemented through one or more processors, controllers, central processing units, logic, software and the like. Further, in some implementations the control circuit 1012 may provide multiprocessor functionality.

The memory 1014, which can be accessed by the control circuit 1012, typically includes one or more processor-readable and/or computer-readable media accessed by at least the control circuit 1012, and can include volatile and/or nonvolatile media, such as RAM, ROM, EEPROM, flash memory and/or other memory technology. Further, the memory 1014 is shown as internal to the control system 1010; however, the memory 1014 can be internal, external or a combination of internal and external memory. Similarly, some or all of the memory 1014 can be internal, external or a combination of internal and external memory of the control circuit 1012. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 103. The memory 1014 can store code, software, executables, scripts, data, content, lists, programming, programs, log or history data, user information, customer information, product information, and the like. While FIG. 10 illustrates the various components being coupled together via a bus, it is understood that the various components may actually be coupled to the control circuit and/or one or more other components directly.

In some embodiments, the communications control system 100 provides a highly-efficient and dynamic, ecommerce carousel identifier generation approach that personalizes the session content by adapting a user's evolving interests and intent in real-time. In addressing known network-centric and Internet-centric problems, the real-time responsiveness is achieved without the computational expense of on-the-fly identifier generation for every user interaction, while still providing personalized session content relevant to the current session and user. Furthermore, the system can identify and adapt to multiple, concurrent themes within a user's session journey, providing highly relevant identifiers even when users explore disparate product categories or exhibit multiple different intents (e.g., search intents, shopping intents, news intents, etc.). This is achieved through a novel combination of off-line pre-generation and validation, efficient vector-based retrieval, sophisticated reranking, and continuous adaptive learning to deliver personalized and engaging identifiers and/or other relevant content with minimal to no latency.

This innovative approach addresses the limitations of existing systems. Purely real-time generation methods, while personalized, typically suffer from slow response times, negatively impacting user experience and/or preventing effective personalized experiences. Rule-based or template-driven systems typically lack the flexibility to adapt to the nuances of individual user journeys. The present communications control system 100, however, overcomes these limitations by pre-generating a diverse library of identifiers using an off-line process that in some embodiments can implement a dual-agent LLM architecture, and cooperatively implementing during a session efficient real-time identifier identification and retrieval. The pre-generation of the identifier library can, in some embodiments, enable the execution of the first model 223 to generate diverse sets of one or more candidate carousel identifiers based on frequently co-occurring items, categories and/or other groupings identified from historical data, including order data, historic browsing data, historic recommendation data, historic searching data, and/or other relevant groupings. This leverages real-world patterns, such as but not limited to purchase patterns, to anticipate user intentions, needs and/or interests. A second model 224 (e.g., trained LLM) can be executed as a quality filter, validating identifiers based on coherence, relevance, accuracy, conciseness and/or other relevant factors, which can result in providing a library of high-quality identifiers that are contextually appropriate relative to one or more item groupings, that are subsequently available during real-time sessions. In some embodiments, the pre-generated item combinations, categories and/or other groupings, and their corresponding identifiers can be embedded into a vector space using one or more suitable trained embedding models (e.g., Word2Vec, GloVe, FastText, Bidirectional Encoder Representations from Transformers (BERT), etc.). The embeddings can be used in real-time enabling fast similarity searches based on the real-time session context, which can include but is not limited to cart contents, recent browsing history (e.g., within a last threshold period of time), preferences, contents viewed, past orders, other such session context (which can include user historic information), and typically a combination of two or more of such context. The session context can also be represented as an embedding through the application of the same or different embedding model and/or algorithm to some or all of the session context.

The combination of pre-generation and subsequent real-time identification provides a content retrieval process that dramatically reduces the real-time computational load compared to generating identifiers from scratch for every user interaction. The identified pre-generated identifiers that have relevance to the current session can be subjected to a sophisticated reranking process, which in some embodiments is based on an application of one or more expected NDCG models providing NDCG objective optimization. This reranking can utilize a comprehensive feature set, which may include identifier features (e.g., length, sentiment, keywords, etc.), user-identifier interaction features (e.g., historical CTR, views, historic purchases, etc.), context features (e.g., cart size, browsing categories, etc.), and the similarity between the user context embedding and retrieved carousel identifiers. This enables the identification and control of the distribution of more relevant and engaging identifiers that can be displayed within milliseconds, providing a seamless and personalized user experience. The communications control system 100 can further continuously apply adaptive learning based in part on feedback and subsequent session context, which can include but is not limited to monitoring key performance indicators (KPIs) such as click-through rates, conversion rates, average order value (AOV), other such indicators, or a combination of two or more of such indicators and/or other information. This feedback loop provides for new retrained and refined models (e.g., identifier generation LLM, verification LLM, and Expected NDCG ranking system, etc.), allowing the communications control system 100 to adapt to evolving users' behaviors and trends, consistently delivering optimal carousel identifiers over time. By combining these components, this system delivers the benefits of real-time personalization without compromising performance or responsiveness. This results in a superior user experience characterized by contextual continuity (e.g., dynamically changing identifiers maintain a cohesive narrative throughout the shopping journey), facilitated product discovery (e.g., relevant product suggestions based on real-time context enhance discovery), increased engagement and conversion (e.g., engaging identifiers attract user attention), and other such factors, which can result in the distribution of more relevant content to a user, provide a user with access to items and/or information that is predicted to be of more interest to the user, leading to higher CTRs and conversions, provide in some instances predictive content, and/or other such benefits.

The machine learning models can be implemented through one or more machine learning models and/or generative artificial intelligence (AI), which may be local to the processing resource, accessed from local memory, and/or implemented by one or more remote entities accessible via the distributed communications network. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. These machine learning models and/or AI can be trained and retrained over time with one or more corpora of information and/or feedback. The corpora of information can include historic data, including the historic data described above, and in-session data acquired in real time and/or maintained over time based on numerous different sessions with numerous different users over time. Still further, some embodiments utilize artificially generated training and/or re-training data. Such data can be generated to simulate one or more data queries, user interactions, action executions, action triggers, conditions, category identifiers, groupings of items, other such information or a combination of two or more of such information. Further, the model training system, in some implementations, continues to acquire data and/or feedback over time to be incorporated into the model training data and used to repeatedly re-train one or more models over time to improve the effectiveness and/or accuracy of the machine learning algorithm models. Such information and/or feedback can include subsequent customer purchase information, subsequent changes in customer behaviors information, subsequent groupings of items, control commands executed to modify the operation of the retail system, changes in inventory, changes in sales, and/or other such information. Still further, some embodiments utilize artificially generated training and/or re-training data. Such data can be generated to simulate one or more conditions (e.g., error conditions, boundary and/or threshold conditions, desired changes in user behavior, undesirable user behaviors, other such conditions, or a combination of two or more of such information). The training data can be dependent on the type of machine learning model or models employed. The machine learning models and/or modeling applications further include the trained, deep learning models that process the data. The learning models can be substantially any relevant modeling, whether custom developed or acquired by a third party. For example, in some embodiments, the trained learning models may include, but are not limited to, one or more neural network machine learning models, one or more convolutional neural networks, one or more deep convolutional and recurrent neural networks, large language models, embedding models, one or more Bayesian models, one or more Markov chain models, one or more feed forward neural networks, decision trees, regression, clustering, and substantially any other relevant modeling and supporting applications (e.g., CORE ML, VISION FRAMEWORK, CAFFE, KERAS, XGBOOST, TENSORFLOW, etc.) or combination of two or more of such machine learning models and/or algorithms to implement the modeling. Additionally or alternatively, the machine learning models can comprise dynamically learned behavior based on, for example, decision tree learning, association rule learning, inductive logic learning, support vector learning, cluster analysis learning, Bayesian network learning, and/or similarity and metric learning, and/or other such modeling.

The machine learning models may be trained on a schedule, a detected threshold use, on a daily basis, in response to triggers and/or other such factors in updating the models with the information and/or transactions that occurred over time. The machine learning models can be trained using historical transactions, previous groupings, previously selected carousel identifiers and/or titles, and intent for items, previous session information, simulated information, other such information, or a combination of different types of information as described above and further below. When a user submits a query to search for items during a session event (e.g., a shopping session), the system in some embodiments can control the acquisition of content, the communication of content and/or control a user computing device in controlling the presentation, rending, and/or order of content (e.g., the items) returned to, for example, provide prioritization of items with contextually relevant carousel identifier.

Some embodiments provide systems to control digital communications between electronic system components over a distributed network, the system comprising: a data communications transceiver communicatively coupled with a distributed communications network; a processing resource communicatively coupled with the data communications transceiver; and a machine readable medium storing instructions that, when executed by the processing resource, cause the processing resource to: in non-real-time, independent of and prior to a current network session between a user and an item acquisition system, causes a trained first model to be executed and applied to historic features of numerous historic groupings of items stored in a database and obtaining, for each of the numerous historic groupings of items based on the application of the first model, a set of one or more carousel identifiers having particular descriptive relevance to the respective historic features of the respective historic grouping of items, producing a collection of sets of one or more carousel identifiers; during the current network session, in real-time, between the user and the item acquisition system through communications over the distributed communications network, obtain session context corresponding to a first set of items associated with actions initiated by the user during the current network session; perform a similarity search in the collection of the sets of one or more carousel identifiers based on the session context; identify a first set of carousel identifiers, of the sets of one or more carousel identifiers, having a threshold relationship with the session context according to the similarity search; determine a ranking of carousel identifiers of the first set of carousel identifiers as a function of identifier features of the first set of carousel identifiers and session features corresponding to the current network session, and identify a first carousel identifier of the first set of carousel identifiers having an estimated highest ranked association with the current network session; and control the data communications transceiver to transmit to a remote user computing device, via the distributed communications network, carousel content data in a predefined format consistent with a carousel interface in controlling the remote user computing device to render, within a session layout, the carousel content data comprising the first carousel identifier personalized for the current network session and item information of the first set of items consistent with the carousel interface.

Some embodiments provide methods to control digital communications between electronic system components over a distributed network, the method comprising: in non-real-time, independent of and prior to a current network session between a user and an item acquisition system, causing, by a processing resource executing instructions stored on a machine readable medium, an execution of a trained first model applied to historic features of numerous historic groupings of items stored in a database, and obtaining, based on the application of the first model, a set of one or more carousel identifiers having particular descriptive relevance to the respective historic features of the respective historic grouping of items in the database, producing a collection of sets of one or more carousel identifiers; during the current network session, in real-time, between the user and the item acquisition system through communications over a distributed communications network, obtaining session context corresponding to a first set of items associated with actions initiated by the user during the current network session; performing a similarity search in the collection of the sets of one or more carousel identifiers based on the session context; identifying a first set of carousel identifiers, of the sets of one or more carousel identifiers, having a threshold relationship with the session context according to the similarity search; determining a ranking of carousel identifiers of the first set of carousel identifiers as a function of identifier features of the first set of carousel identifiers and session features corresponding to the current network session, and identifying a first carousel identifier of the first set of carousel identifiers having an estimated highest ranked association with the current network session; controlling a data communications transceiver to transmit to a remote user computing device, via the distributed communications network, carousel content data in a predefined format consistent with a carousel interface; and controlling the remote user computing device to render, within a session layout, the carousel content data comprising the first carousel identifier personalized for the current network session and item information of the first set of items consistent with the carousel interface.

Some embodiments provide non-transitory machine readable mediums storing instructions that, when executed, cause one or more processing resources to: independent of a current network session between a user and an item acquisition system: cause, by the processing resource executing instructions stored on a readable medium, an execution of a trained first model applied to historic features of numerous historic groupings of items stored in a database and obtain, for each of the numerous historic groupings of items based on the application of the first model, a set of one or more carousel identifiers having particular descriptive relevance to the respective historic features of the respective historic grouping of items, producing a collection of sets of one or more carousel identifiers; and during the current network session, in real-time, between the user and the item acquisition system through communications over the distributed communications network, obtain, during a current network session by the processing resource executing the instructions, session context corresponding to a first set of items associated with actions initiated by the user during the current network session; perform, by the processing resource, a similarity search in the collection of the sets of one or more carousel identifiers based on the session context; identify a first set of carousel identifiers, of the sets of one or more carousel identifiers, having a threshold relationship with the session context according to the similarity search; determine, by the processing resource, a ranking of carousel identifiers of the first set of carousel identifiers as a function of identifier features of the first set of carousel identifiers and session features corresponding to the current network session, and identify a first carousel identifier of the first set of carousel identifiers having an estimated highest ranked association with the current network session; and control, by the processing resource, the data communications transceiver to transmit to a remote user computing device, via the distributed communications network, carousel content data in a predefined format consistent with a carousel interface in controlling the remote user computing device to render, within a session layout, the carousel content data comprising the first carousel identifier personalized for the current network session and item information of the first set of items consistent with the carousel interface. The medium in some embodiments comprises instructions executable by the processing resource, that when executed independent of and prior to the current network session, cause, by the processing resource, an execution of a trained second model applied to each carousel identifier of the sets of one or more carousel identifiers and validate a relevance of each the carousel identifiers to the respective historic grouping of items.

Those skilled in the art will recognize that a wide variety of other modifications, alterations, and combinations can also be made with respect to the above described embodiments without departing from the scope of the disclosure, and that such modifications, alterations, and combinations are to be viewed as being within the ambit of the inventive concept.

The invention claimed is:

1. A system to control digital communications between electronic system components over a distributed network, the system comprising:

a data communications transceiver communicatively coupled with a distributed communications network;

a processing resource communicatively coupled with the data communications transceiver; and a machine readable medium storing instructions that, when executed by the processing resource, cause the processing resource to:

in non-real-time, independent of and prior to a current network session between a user and an item acquisition system, cause an execution of a trained first model applied to historic features of numerous historic groupings of items stored in a database to obtain, for each of the numerous historic groupings of items based on the application of the first model, a set of one or more carousel identifiers having particular descriptive relevance to the respective historic features of the respective historic grouping of items, to produce a collection of sets of one or more carousel identifiers; and during the current network session, in real-time, between the user and the item acquisition system through communications over the distributed communications network, obtain session context corresponding to a first set of items associated with actions initiated by the user during the current network session;

perform a similarity search in the collection of the sets of one or more carousel identifiers based on the session context;

identify a first set of carousel identifiers, of the sets of one or more carousel identifiers, having a threshold relationship with the session context according to the similarity search;

determine a ranking of carousel identifiers of the first set of carousel identifiers as a function of identifier features of the first set of carousel identifiers and session features corresponding to the current network session, and identify a first carousel identifier of the first set of carousel identifiers having an estimated highest ranked association with the current network session; and control the data communications transceiver to transmit to a remote user computing device, via the distributed communications network, carousel content data in a predefined format consistent with a carousel interface in controlling the remote user computing device to render, within a session layout, the carousel content data comprising the first carousel identifier personalized for the current network session and item information of the first set of items consistent with the carousel interface.

2. The system of claim 1, wherein the processing resource, in executing the instructions is further configured to:

independent of and prior to the current network session:

cause an execution of a trained second model applied to each carousel identifier of the sets of one or more carousel identifiers and validate a relevance of each of the carousel identifiers to the respective historic grouping of items.

3. The system of claim 1, wherein the processing resource, in executing the instructions is further configured to:

independent of and prior to the current network session:

cause an execution of, for each of the historic groupings of items, an embedding model and obtain a respective vectorized embedding for each of the historic groupings of items; and during the current network session, in real-time:

cause an execution of the embedding model relative to the session context and obtain a session context embedding;

wherein the performing the similarity search comprises performing the similarity search based on the session context embedding relative to the vectorized embeddings, and identify a first vectorized embedding having a threshold relationship with the session context embedding, wherein the first vectorized embedding corresponds to the first set of carousel identifiers.

4. The system of claim 3, wherein the session context comprises virtual cart contents, browsing history that previously occurred within a threshold duration of time to the current network session, and one or more historic completed orders implemented by the user through previous network sessions.

5. The system of claim 3, wherein the causing the execution of the embedding model relative to each of the historic groupings of items comprises causing the execution of the embedding model applied to historic item context of the respective historic grouping of items and historic category identifiers of historic categories within which historic item identifiers are associated; and wherein the causing the execution of the embedding model relative to the session context comprises causing the execution of the embedding model to a combination of session item identifiers of a set of session items and session category identifiers of categories within which the session item identifiers are associated, and obtain the session context embedding.

6. The system of claim 1, wherein the processing resource, in the determining the ranking of the carousel identifiers of the first set of carousel identifiers, is configured to cause an execution of a trained ranking model relative to identifier interaction features corresponding to historic interactions by multiple other users relative the first set of carousel identifiers, context features corresponding to the current network session, and the identifier features of the respective the carousel identifiers of the first set of carousel identifiers, and establish using the ranking model a ranked order of the first set of carousel identifiers as a function of expected relevance of the ranked carousel identifiers based on the user and contextual relevance to the first set of items.

7. The system of claim 6, wherein the ranking model applies a normalized discounted cumulative gain (NDCG) evaluation of the first set of carousel identifiers.

8. The system of claim 6, wherein the processing resource, in executing the instructions is further configured to:

in non-real-time, independent of and prior to a current network session, for each of the sets of one or more carousel identifiers, determine a preliminary ranking of each of the one or more carousel identifiers of each of the sets of one or more carousel identifiers as a function of similarity between the respective carousel identifier and the corresponding historic grouping of items; and during the current network session, in real-time:

wherein the identifying the first set of carousel identifiers comprises selecting a threshold number of carousel identifiers as a function of the preliminary ranking of each of carousel identifiers of the first set of carousel identifiers.

9. The system of claim 1, wherein the processing resource, in executing the instructions is further configured to:

during the current network session, in real-time:

identify, based on a selected set of items selected by the user during the current network session, a first theme corresponding to the first set of one or more items and a second theme corresponding to a second set of one or more items associated with actions initiated by the user;

wherein the performing the similarity search comprises identifying the first set of carousel identifiers corresponding to the first theme, and identifying a second set of carousel identifiers, of the sets of one or more carousel identifiers, having a threshold relationship with the session context and corresponding to the second theme;

determine rankings of carousel identifiers of the second set of carousel identifiers as a function of the identifier features of the second set of carousel identifiers and the session features corresponding to the current network session and the second theme, and identify a second carousel identifier of the second set of carousel identifiers having an estimated highest ranked association with the current network session and the second theme; and wherein the controlling the data communications transceiver comprises controlling the data communications transceiver in transmitting the carousel content data in the predefined format consistent with the carousel interface in controlling the remote user computing device to render, within the session layout, two sets of the carousel content data comprising: a first displayed carousel comprising the first carousel identifier positionally associated with the item information of the first set of items and a second displayed carousel comprising the second carousel identifier positionally associated with the second set of items consistent with the carousel interface.

10. A method to control digital communications between electronic system components over a distributed network, the method comprising:

in non-real-time, independent of and prior to a current network session between a user and an item acquisition system, causing, by a processing resource executing instructions stored on a machine readable medium, an execution of a trained first model applied to historic features of numerous historic groupings of items stored in a database, and obtaining, based on the application of the first model, a set of one or more carousel identifiers having particular descriptive relevance to the respective historic features of the respective historic grouping of items in the database, producing a collection of sets of one or more carousel identifiers;

during the current network session, in real-time, between the user and the item acquisition system through communications over a distributed communications network, obtaining session context corresponding to a first set of items associated with actions initiated by the user during the current network session;

performing a similarity search in the collection of the sets of one or more carousel identifiers based on the session context;

identifying a first set of carousel identifiers, of the sets of one or more carousel identifiers, having a threshold relationship with the session context according to the similarity search;

determining a ranking of carousel identifiers of the first set of carousel identifiers as a function of identifier features of the first set of carousel identifiers and session features corresponding to the current network session, and identifying a first carousel identifier of the first set of carousel identifiers having an estimated highest ranked association with the current network session;

controlling a data communications transceiver to transmit to a remote user computing device, via the distributed communications network, carousel content data in a predefined format consistent with a carousel interface; and controlling the remote user computing device to render, within a session layout, the carousel content data comprising the first carousel identifier personalized for the current network session and item information of the first set of items consistent with the carousel interface.

11. The method of claim 10, further comprising:

independent of and prior to the current network session:

causing an execution of a trained second model applied to each carousel identifier of the sets of one or more carousel identifiers; and validating, by the processing resource using the second model, a relevance of each of the carousel identifiers to the respective historic grouping of items.

12. The method of claim 10, further comprising:

independent of and prior to the current network session:

causing, for each of the historic groupings of items, an execution of an embedding model relative to the respective historic grouping of items; and obtaining, using the embedding model, a respective vectorized embedding for each of the historic groupings of items; and during the current network session, in real-time:

causing the execution of the embedding model relative to the session context; and obtaining, using the embedding model, a session context embedding of the session context;

wherein the performing the similarity search comprises performing the similarity search based on the session context embedding relative to the vectorized embeddings, and identifying a first vectorized embedding having a threshold relationship with the session context embedding, wherein the first vectorized embedding corresponds to the first set of carousel identifiers.

13. The method of claim 12, wherein the session context comprises virtual cart contents, browsing history that previously occurred within a threshold duration of time to the current network session, and one or more historic completed orders implemented by the user through previous network sessions.

14. The method of claim 12, wherein the causing the execution of the embedding model relative to each of the historic groupings of items comprises causing the execution of the embedding model applied to historic item context of the respective historic grouping of items and historic category identifiers of historic categories within which historic item identifiers are associated; and wherein the causing the execution of the embedding model relative to the session context comprises causing the execution of the embedding model to a combination of session item identifiers of a set of session items and session category identifiers of categories within which the session item identifiers are associated, and obtaining the session context embedding.

15. The method of claim 10, wherein the determining the ranking of the carousel identifiers of the first set of carousel identifiers comprises causing an execution of a trained ranking model relative to identifier interaction features corresponding to historic interactions by multiple other users relative the first set of carousel identifiers, context features corresponding to the current network session, and the identifier features of the respective the carousel identifiers of the first set of carousel identifiers; and establishing, using the ranking model, a ranked order of the first set of carousel identifiers as a function of expected relevance of the ranked carousel identifiers based on the user and contextual relevance to the first set of items.

16. The method of claim 15, wherein causing the execution of the ranking model comprises applying a normalized discounted cumulative gain (NDCG) evaluation of the first set of carousel identifiers.

17. The method of claim 15, further comprising:

in non-real-time, independent of and prior to a current network session, determining, for each of the sets of one or more carousel identifiers, a preliminary ranking of each of the one or more carousel identifiers of each of the sets of one or more carousel identifiers as a function of similarity between the respective carousel identifier and the corresponding historic grouping of items; and during the current network session, in real-time:

wherein the identifying the first set of carousel identifiers comprises selecting a threshold number of carousel identifiers as a function of the preliminary ranking of each of carousel identifiers of the first set of carousel identifiers.

18. The method of claim 10, further comprising:

during the current network session, in real-time:

identifying, based on a selected set of items selected by the user during the current network session, a first theme corresponding to the first set of one or more items and a second theme corresponding to a second set of one or more items associated with actions initiated by the user;

wherein the performing the similarity search comprises identifying the first set of carousel identifiers corresponding to the first theme, and identifying a second set of carousel identifiers, of the sets of one or more carousel identifiers, having a threshold relationship with the session context and corresponding to the second theme;

determining a ranking of carousel identifiers of the second set of carousel identifiers as a function of the identifier features of the second set of carousel identifiers and the session features corresponding to the current network session and the second theme, and identifying a second carousel identifier of the second set of carousel identifiers having an estimated highest ranked association with the current network session and the second theme; and wherein the controlling the data communications transceiver in the transmitting the carousel content data, comprises controlling the data communications transceiver in transmitting the carousel content data in the predefined format consistent in controlling the remote user computing device to render, within the session layout, two sets of the carousel content data comprising: a first displayed carousel comprising the first carousel identifier positionally associated with the item information of the first set of items and a second displayed carousel comprising the second carousel identifier positionally associated with the second set of items consistent with the carousel interface.

19. A non-transitory machine readable medium storing instructions that, when executed, cause a processing resource to:

independent of a current network session between a user and an item acquisition system:

cause, by the processing resource executing instructions stored on a readable medium, am execution of a trained first model applied to historic features of numerous historic groupings of items stored in a database and obtain, for each of the numerous historic groupings of items based on the application of the first model, a set of one or more carousel identifiers having particular descriptive relevance to the respective historic features of the respective historic grouping of items, producing a collection of sets of one or more carousel identifiers; and during the current network session, in real-time, between the user and the item acquisition system through communications over a distributed communications network, obtain, during a current network session by the processing resource executing the instructions, session context corresponding to a first set of items associated with actions initiated by the user during the current network session;

perform, by the processing resource, a similarity search in the collection of the sets of one or more carousel identifiers based on the session context;

identify a first set of carousel identifiers, of the sets of one or more carousel identifiers, having a threshold relationship with the session context according to the similarity search;

determine, by the processing resource, a ranking of carousel identifiers of the first set of carousel identifiers as a function of identifier features of the first set of carousel identifiers and session features corresponding to the current network session, and identify a first carousel identifier of the first set of carousel identifiers having an estimated highest ranked association with the current network session; and control, by the processing resource, a data communications transceiver to transmit to a remote user computing device, via the distributed communications network, carousel content data in a predefined format consistent with a carousel interface in controlling the remote user computing device to render, within a session layout, the carousel content data comprising the first carousel identifier personalized for the current network session and item information of the first set of items consistent with the carousel interface.

20. The medium of claim 19, further comprising instructions executable by the processing resource and independent of and prior to the current network session to cause, by the processing resource, an execution of a trained second model applied to each carousel identifier of the sets of one or more carousel identifiers and validate a relevance of each the carousel identifiers to the respective historic grouping of items.

* * * * *